US009875521B2

(12) United States Patent
Kondo

(10) Patent No.: US 9,875,521 B2
(45) Date of Patent: Jan. 23, 2018

(54) IMAGE OUTPUT APPARATUS, IMAGE OUTPUT METHOD, AND PROGRAM

(75) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 0 days.

(21) Appl. No.: 14/131,115

(22) PCT Filed: Jun. 4, 2012

(86) PCT No.: PCT/JP2012/064369
§ 371 (c)(1), (2), (4) Date: Jan. 6, 2014

(87) PCT Pub. No.: WO2013/005518
PCT Pub. Date: Jan. 10, 2013

(65) Prior Publication Data

US 2014/0146086 A1 May 29, 2014

(30) Foreign Application Priority Data

Jul. 6, 2011 (JP) ................................ 2011-149708

(51) Int. Cl.
*G09G 5/00* (2006.01)
*G06T 3/40* (2006.01)
(Continued)

(52) U.S. Cl.
CPC ................. *G06T 3/40* (2013.01); *G09G 5/14* (2013.01); *G09G 5/391* (2013.01); *G09G 5/397* (2013.01);
(Continued)

(58) Field of Classification Search
CPC ............ G09G 2340/0407; G06T 11/60; G06T 15/005; G06T 1/20; G06F 3/0481; G01P 3/40; G01J 1/36
(Continued)

(56) References Cited

U.S. PATENT DOCUMENTS 7,567,245 B2 7/2009 Mamata
2002/0075407 A1* 6/2002 Cohen-Solal ............ H04N 5/45 348/565
(Continued)

FOREIGN PATENT DOCUMENTS

CN 1893590 A 1/2007
CN 100375501 C 3/2008
(Continued)

OTHER PUBLICATIONS

International Search Report, dated Aug. 28, 2012, which issued during the prosecution of International Patent Application No. PCT/JP2012/064369.
(Continued)

*Primary Examiner* — Xiao Wu
*Assistant Examiner* — Sarah Lhymn
(74) *Attorney, Agent, or Firm* — Troutman Sanders LLP

(57) ABSTRACT

An image output apparatus includes an input image acquiring unit, a target attribute value acquiring unit that acquires at least one target attribute value, which is an original attribute value of a subject contained in an input image, an attribute value acquiring unit that acquires at least one attribute value of the subject contained in an output image formed using the input image, a difference information acquiring unit that acquires at least one piece of difference information indicating a difference between the at least one target attribute value acquired by the target attribute value acquiring unit and the at least one attribute value acquired by the attribute value acquiring unit, and an image output unit that, in a case where the at least one piece of difference information does not satisfy a predetermined condition, changes an output mode of the output image formed using the input image, and performs output.

25 Claims, 17 Drawing Sheets

Image output apparatus
1
103 Input image acquiring unit
101 Input video storage unit
106 Attribute value acquiring unit
104 Display attribute value acquiring unit
102 Data broadcast receiving unit
107 Difference information acquiring unit
105 Target attribute value acquiring unit
110 Condition changing unit
108 Image output unit
1051 Target attribute value storage part
109 Accepting unit
111 Change information changing unit
1052 Target attribute value acquiring part
112 Target attribute value changing unit

(51) Int. Cl.

| | |
|---|---|
| ***H04N 21/431*** | (2011.01) |
| ***H04N 21/44*** | (2011.01) |
| ***H04N 21/4402*** | (2011.01) |
| ***H04N 21/485*** | (2011.01) |
| ***G09G 5/14*** | (2006.01) |
| ***G09G 5/391*** | (2006.01) |
| ***G09G 5/397*** | (2006.01) |
| ***H04N 21/45*** | (2011.01) |

(52) U.S. Cl.
CPC ..... *H04N 21/4312* (2013.01); *H04N 21/4318* (2013.01); *H04N 21/44008* (2013.01); *H04N 21/440263* (2013.01); *H04N 21/4516* (2013.01); *H04N 21/4854* (2013.01); *G09G 2320/103* (2013.01); *G09G 2340/12* (2013.01); *G09G 2340/125* (2013.01)

(58) Field of Classification Search
USPC ......... 345/418, 501, 619, 660, 661, 665, 66; 356/23, 217
See application file for complete search history.

(56) References Cited

U.S. PATENT DOCUMENTS

| | | | | |
|---|---|---|---|---|
| 2004/0057634 | A1* | 3/2004 | Mutoh | 382/298 |
| 2004/0223007 | A1 | 11/2004 | Mamata | |
| 2006/0209957 | A1* | 9/2006 | Riemens et al. | 375/240.16 |
| 2007/0031117 | A1* | 2/2007 | Abe | 386/95 |
| 2007/0206923 | A1* | 9/2007 | Murakoshi et al. | 386/95 |
| 2008/0068491 | A1* | 3/2008 | Yuyama | H04N 5/235 348/362 |
| 2008/0069516 | A1* | 3/2008 | Takahashi et al. | 386/68 |
| 2009/0231458 | A1* | 9/2009 | Moriyama | G06K 9/00228 348/222.1 |
| 2009/0322871 | A1* | 12/2009 | Ji | G01S 7/412 348/115 |
| 2010/0157079 | A1 | 6/2010 | Atanassov et al. | |
| 2010/0215254 | A1* | 8/2010 | Prokhorov | G06K 9/3241 382/159 |
| 2010/0284568 | A1* | 11/2010 | Tojo | G06K 9/00261 382/103 |
| 2010/0321472 | A1* | 12/2010 | Kuwabara et al. | 348/43 |
| 2011/0081132 | A1 | 4/2011 | Iwata et al. | |
| 2011/0142426 | A1 | 6/2011 | Sasaki et al. | |

FOREIGN PATENT DOCUMENTS

| | | | | | |
|---|---|---|---|---|---|
| CN | 102077585 | A | | 5/2011 | |
| JP | 09055912 | A | * | 2/1997 | H04N 5/907 |
| JP | H9-55912 | A | | 2/1997 | |
| JP | 2825482 | B2 | | 11/1998 | |
| JP | 3072306 | B2 | | 7/2000 | |
| JP | 2001-057671 | A | | 2/2001 | |
| JP | 2002-297119 | A | | 10/2002 | |
| JP | 2004-279503 | A | | 10/2004 | |
| JP | 2008-005122 | A | | 1/2008 | |
| JP | 2008-028876 | A | | 2/2008 | |
| JP | 2010-060454 | A | | 3/2010 | |
| JP | 2010060454 | A | * | 3/2010 | |
| JP | 2011-035795 | A | | 2/2011 | |
| JP | 2011035795 | A | * | 2/2011 | |
| TW | 200824439 | A | | 6/2008 | |
| WO | 2010137104 | A1 | | 12/2010 | |

OTHER PUBLICATIONS

Keshavarz et al., Intra-visual conflict in visually induced motion sickness, Displays 32: 181-188. (2011).

Extended European Search Report dated Apr. 2, 2015, issued in corresponding European Application No. 12808107.2.

Office Action dated Apr. 15, 2015, issued in corresponding Japanese Patent Application No. 2011-149708.

Japanese Office Action dated Nov. 4, 2015 issued in corresponding Japanese Patent Application No. 2011-149708.

First Office Action dated Jun. 22, 2016 issued in Chinese Patent Application No. 2012800291152.

Decision of Rejection dated Jul. 5, 2016 issued in Japanese Patent Application No. 2011-149708.

First Office Action dated Oct. 18, 2016 issued during the prosecution of Taiwanese Application No. 101130006.

Second Chinese Office Action dated Jan. 17, 2017 issued in corresponding Chinese Application No. 2012800291152.

* cited by examiner

| ID | Subject identifier | Attribute identifier | Target attribute value |
|---|---|---|---|
| 1 | Human face | Size (vertical) | 10 cm or more, 50 cm or less |
| 2 | Vehicle | Size (horizontal) | 200 cm or more |
| 3 | Natural object | Speed | 30 cm/sec or less |
| 4 | ——— | Speed | If greater than 0 cm/sec, then 1 cm/sec or more |
| 5 | ——— | Representative luminance value | n1 or less |
| 6 | ——— | Representative luminance value | n2 or more |
| ⋮ | ⋮ | ⋮ | ⋮ |

| ID | Display attribute value | | Attribute identifier | Target attribute value |
|---|---|---|---|---|
| | Display screen type | Size | | |
| 1 | Liquid crystal | Up to 40 inches | Representative luminance value (X) | C1＜＝X＜＝C2 |
| 2 | Liquid crystal | 41 to 65 inches | Representative luminance value (X) | C1＜＝X＜＝C3 |
| 3 | Liquid crystal | 66 to 100 inches | Representative luminance value (X) | C1＜＝X＜＝C4 |
| 4 | Liquid crystal | 101 inches or more | Representative luminance value (X) | C1＜＝X＜＝C5 |
| 5 | Organic EL | Up to 40 inches | Representative luminance value (X) | C1＜＝X＜＝C6 |
| 6 | Organic EL | 41 to 65 inches | Representative luminance value (X) | C1＜＝X＜＝C7 |
| 7 | Organic EL | 66 to 100 inches | Representative luminance value (X) | C1＜＝X＜＝C8 |
| 8 | Organic EL | 101 inches or more | Representative luminance value (X) | C1＜＝X＜＝C9 |
| 9 | Plasma | Up to 40 inches | Representative luminance value (X) | C1＜＝X＜＝C10 |
| 10 | Plasma | 41 to 65 inches | Representative luminance value (X) | C1＜＝X＜＝C11 |
| 11 | Plasma | 66 to 100 inches | Representative luminance value (X) | C1＜＝X＜＝C12 |
| 12 | Plasma | 101 inches or more | Representative luminance value (X) | C1＜＝X＜＝C13 |
| ⋮ | ⋮ | ⋮ | ⋮ | ⋮ |

FIG.15

IMAGE OUTPUT APPARATUS, IMAGE OUTPUT METHOD, AND PROGRAM

CROSS-REFERENCE TO RELATED APPLICATIONS

This is a U.S. national phase application under 35 U.S.C. § 371 of International Patent Application No. PCT/JP2012/064369, filed on Jun. 4, 2012, and claims benefit of priority to Japanese Patent Application No. JP 2011-149708, filed on Jul. 6, 2011. The International Application was published on Jan. 10, 2013, as International Publication No. WO 2013/005518 under PCT Article 21(2). The entire contents of these applications are hereby incorporated by reference.

TECHNICAL FIELD

The present invention relates to an image output apparatus and the like for outputting images.

BACKGROUND ART

Conventionally, there has been an image output apparatus that, even in a case where the display screen size of an additional monitor is smaller than that of a main body, makes it possible to easily identify character strings or icons displayed on the screen of the additional monitor (see Patent Document 1). This sort of image output apparatus performs a change process so as to make map display, icon display, and character font size suitable for the display screen size of the additional monitor, and transfers image data after this change process to the additional monitor.

Furthermore, conventionally, there has been a video data processing apparatus that, in the case of displaying enlarged views of some pieces of video freely selected from among multiple pieces of video, switches the screen configuration so as to change the position and the size of each video display area, thereby generating and displaying a multi-split screen that is easily viewable for a user (see Patent Document 2).

Moreover, conventionally, there has been a stroboscopic display apparatus that is intended to reduce the memory and the cost, by detecting motion from video signals in two fields, and storing only the portions in which motion has been detected in a storage unit (see Patent Document 3).

CITATION LIST

Patent Document

[Patent Document 1] JP 2010-60454A (p. 1, FIG. 1, etc.)
[Patent Document 2] JP 2008-28876A (p. 1, FIG. 1, etc.)
[Patent Document 3] JP H9-55912A (p. 1, FIG. 1, etc.)

SUMMARY OF INVENTION

Technical Problem

However, according to such conventional image output apparatuses, an attribute value of a subject such as the size or the movement speed of the subject in output images may be significantly different from an actual attribute value depending on the size of screen frames, which is problematic in that a user who is viewing the images is too much stimulated, feels a sense of unnaturalness, or tends to get eyestrain, for example.

More specifically, for example, due to a recent increase in the size of display screens, a user feels a greater sense of immersion into the content, and the transition amount per unit time of a subject in the images increases in proportion to the size of the screen, so that the user feel sick, i.e., suffers from "visually induced motion sickness". However, no conventional image output apparatus can solve the problem of visually induced motion sickness.

Solution to Problem

A first aspect of the present invention is directed to an image output apparatus, including: an input image acquiring unit that acquires an input image; a target attribute value acquiring unit that acquires at least one target attribute value, which is an original attribute value of a subject contained in the input image; an attribute value acquiring unit that acquires at least one attribute value of the subject contained in an output image formed using the input image; a difference information acquiring unit that acquires at least one piece of difference information indicating a difference between the at least one target attribute value acquired by the target attribute value acquiring unit and the at least one attribute value acquired by the attribute value acquiring unit; and an image output unit that, in a case where the at least one piece of difference information does not satisfy a predetermined condition, changes an output mode of the output image formed using the input image, and performs output.

With this configuration, the problems for a user who is viewing the images can be reduced or eliminated.

Furthermore, a second aspect of the present invention is directed to the image output apparatus according to the first aspect, wherein, in a case where the difference between the at least one target attribute value and the at least one attribute value is so large that the at least one piece of difference information does not satisfy the predetermined condition, the image output unit changes the output mode of the output image formed using the input image, so as to reduce the difference between the at least one target attribute value and the at least one attribute value acquired by the attribute value acquiring unit, and performs output.

With this configuration, an attribute value of a subject in output images can be made to match or approach an actual attribute value, and, thus, the problems for a user who is viewing the images can be reduced or eliminated.

Furthermore, a third aspect of the present invention is directed to the image output apparatus according to the first or the second aspect, wherein the image output unit includes: a condition storage part in which the predetermined condition is stored; a judging part that judges whether or not the at least one piece of difference information satisfies the predetermined condition; a window size determining part that, in a case where the judging part judges that the at least one piece of difference information does not satisfy the predetermined condition, determines a size of a window to which the output image is to be output; and an output part that outputs the output image to the window having the size determined by the window size determining part.

With this configuration, the size of a window to which output images are to be output can be changed, and, thus, the problems for a user who is viewing the images can be reduced or eliminated.

Furthermore, a fourth aspect of the present invention is directed to the image output apparatus according to the third aspect, wherein the image output unit further includes an another image output part that, in a case where the size of the window is smaller than that of a screen frame, outputs an image different from the output image, to a second region different from a region of the window to which the output image is to be output.

With this configuration, the free space obtained by making the size of a window to which output images are to be output smaller than that of the screen frame can be effectively used.

Furthermore, a fifth aspect of the present invention is directed to the image output apparatus according to the fourth aspect, wherein the another image output part performs stroboscopic output to at least two regions obtained by dividing the second region.

With this configuration, the free space obtained by making the size of a window to which output images are to be output smaller than that of the screen frame can be effectively used.

Furthermore, a sixth aspect of the present invention is directed to the image output apparatus according to the fourth aspect, further including a data broadcast receiving unit that receives a data broadcast, wherein the another image output part outputs the data broadcast to the second region.

With this configuration, the free space obtained by making the size of a window to which output images are to be output smaller than that of the screen frame can be effectively used.

Furthermore, a seventh aspect of the present invention is directed to the image output apparatus according to the fourth aspect, further including an input video storage unit in which input video that can be divided into at least two chapters can be stored, wherein the input image acquiring unit sequentially reads each of at least two input images contained in the input video from the input video storage unit, and the another image output part outputs an image representing each of the at least two chapters contained in the input video to the second region.

With this configuration, the free space obtained by making the size of a window to which output images are to be output smaller than that of the screen frame can be effectively used.

Furthermore, an eighth aspect of the present invention is directed to the image output apparatus according to the fourth aspect, wherein the another image output part outputs, to the second region, an image obtained by performing image processing different from that performed on the output image, on the same input image from which the output image that is to be output to the window is formed.

With this configuration, the free space obtained by making the size of a window to which output images are to be output smaller than that of the screen frame can be effectively used.

Furthermore, a ninth aspect of the present invention is directed to the image output apparatus according to the third aspect, wherein the image output unit further includes a PinP output part that, in a case where the size of the window determined by the window size determining part is larger than that of a screen frame of the image output apparatus, outputs part of the output image to the screen frame, and outputs an image obtained by reducing the output image, to a window smaller than the screen frame.

With this configuration, an attribute value of a subject in output images can be made to match or approach an actual attribute value, and the entire output images can be output.

Furthermore, a tenth aspect of the present invention is directed to the image output apparatus according to any one of the first to the ninth aspects, wherein the target attribute value acquiring unit acquires a target size, which is an original size of the subject contained in the input image, the attribute value acquiring unit acquires a size of the subject contained in the output image formed using the input image, and the difference information acquiring unit acquires size difference information, which is difference information indicating a difference between the target size acquired by the target attribute value acquiring unit and the subject size acquired by the attribute value acquiring unit.

With this configuration, the size of a subject in output images can be made to match or approach an actual size, and, thus, the problems for a user who is viewing the images can be reduced or eliminated.

Herein, the size may be the actual size of a subject and the size thereof displayed on the output apparatus, or may be the apparent size of a subject as viewed from a camera position and the apparent size thereof as viewed by the user on the output apparatus.

Furthermore, an eleventh aspect of the present invention is directed to the image output apparatus according to any one of the first to the ninth aspects, wherein the target attribute value acquiring unit acquires target speed information, which is information on a target value relating to a movement speed of the subject contained in the input image, the attribute value acquiring unit acquires speed information relating to a movement speed of the subject contained in the output image formed using the input image, and the difference information acquiring unit acquires speed difference information, which is difference information indicating a difference between the target speed information acquired by the target attribute value acquiring unit and the speed information acquired by the attribute value acquiring unit.

With this configuration, the movement speed of a subject in output images can be made to match or approach an actual speed, and, thus, the problems for a user who is viewing the images can be reduced or eliminated.

Herein, the movement speed may be the actual movement speed of a subject, or may be the apparent movement speed of a subject.

Furthermore, a twelfth aspect of the present invention is directed to the image output apparatus according to the first or the second aspect, wherein, in a case where the at least one piece of difference information does not satisfy the predetermined condition, the image output unit forms and outputs an output image obtained by changing predetermined at least one attribute value of the input image.

With this configuration, the problems for a user who is viewing the images can be reduced or eliminated.

Furthermore, a thirteenth aspect of the present invention is directed to the image output apparatus according to the twelfth aspect, wherein the predetermined at least one attribute value is a brightness of the input image.

With this configuration, the brightness of output images can be properly controlled. As a result, the problems for a user who is viewing the images can be reduced or eliminated.

Furthermore, a fourteenth aspect of the present invention is directed to the image output apparatus according to the twelfth aspect, wherein the input image acquiring unit acquires at least two input images, and the predetermined at least one attribute value is a reproduction speed of the at least two input images.

With this configuration, the reproduction speed of output images can be properly controlled. As a result, the problems for a user who is viewing the images can be reduced or eliminated.

Furthermore, a fifteenth aspect of the present invention is directed to the image output apparatus according to the twelfth aspect, wherein the input image acquiring unit acquires at least two input images, and the predetermined at least one attribute value is the number of fields of the at least two input images that are to be output per unit time.

With this configuration, the number of frames of output images per unit time can be properly controlled. As a result, the problems for a user who is viewing the images can be reduced or eliminated.

Furthermore, a sixteenth aspect of the present invention is directed to the image output apparatus according to any one of the first to the fifteenth aspects, further including a display attribute value acquiring unit that acquires at least one display attribute value, which is an attribute value of a display screen of the image output apparatus, wherein a manner of the image output unit for changing the output mode varies depending on the at least one display attribute value.

With this configuration, output images properly matching an attribute value of a display screen on which a user views the images can be output. As a result, the problems for a user who is viewing the images can be reduced or eliminated.

Furthermore, a seventeenth aspect of the present invention is directed to the image output apparatus according to any one of the first to the sixteenth aspects, further including: an accepting unit that accepts a change instruction, which is an instruction to change the predetermined condition; and a condition changing unit that changes the predetermined condition according to the change instruction.

With this configuration, the condition for changing the output mode of output images can be customized according to the user's preference. As a result, the problems when viewing the images can be reduced or eliminated according to the user's personal attributes.

Furthermore, an eighteenth aspect of the present invention is directed to the image output apparatus according to any one of the first to the sixteenth aspects, wherein at least one target attribute value is stored in advance in a storage medium, and the image output apparatus further includes: an accepting unit that accepts a target attribute value change instruction, which is an instruction to change the target attribute value; and a target attribute value changing unit that changes the target attribute value according to the target attribute value change instruction.

With this configuration, the target attribute value for changing the output mode of output images can be specified according to the user's preference. As a result, the problems when viewing the images can be reduced or eliminated according to the user's personal attributes.

Furthermore, a nineteenth aspect of the present invention is directed to the image output apparatus according to any one of the first to the eighteenth aspects, further including: an accepting unit that accepts change information, which is a degree of changing the output mode of the output image; and a change information changing unit that changes a degree of changing the output mode of the output image, according to the change information; wherein, in a case where the at least one piece of difference information does not satisfy the predetermined condition, the image output unit changes the output mode of the output image formed using the input image, according to the change information, and performs output.

With this configuration, the degree of changing the output mode of output images can be customized according to the user's preference. As a result, the problems when viewing the images can be reduced or eliminated according to the user's personal attributes.

Advantageous Effects of Invention

With the image output apparatus according to the present invention, the problems for a user who is viewing images can be reduced or eliminated.

BRIEF DESCRIPTION OF DRAWINGS

FIG. 4 is a target attribute value management table in this embodiment.

FIG. 9 is a view showing an image acquired by the input image acquiring unit 103 in this embodiment.

FIG. 15 is a target attribute value management table in this embodiment.

DESCRIPTION OF EMBODIMENT

Figure 1:
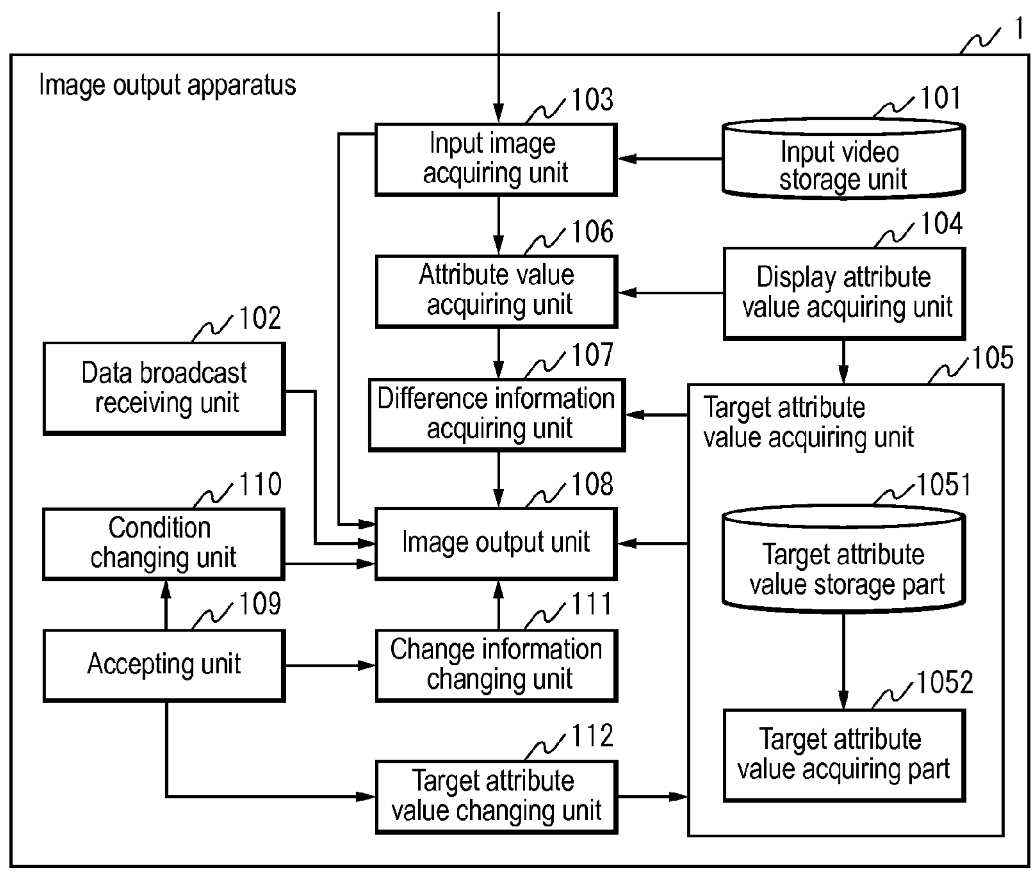
FIG. 1 is a block diagram of an image output apparatus in Embodiment 1.

Hereinafter, an embodiment of an image output apparatus and the like will be described with reference to the drawings. Note that constituent elements denoted by the same reference numerals perform the same operations in the embodiments, and, thus, a description thereof may not be repeated.

Embodiment 1

In this embodiment, an image output apparatus will be described that changes an output mode if there is a difference between an attribute of a subject contained in an input image and an attribute in an output image.

Note that, in this embodiment, changing an output mode typically refers to changing an output mode for reducing the difference between an attribute value (a size, a movement speed, a brightness, etc.) of a subject and an attribute value in an output image. That is to say, in this embodiment, an image output apparatus will be described that has a technique for, for example, making an attribute value in an output image match or approach an actual attribute value of a subject. Herein, such a technique may be referred to as an image normalization technique.

Furthermore, in this embodiment, changing an output mode refers to, for example, changing the size of a window to which an image is to be output, changing an attribute value of an image such as the brightness of an image, changing the reproduction speed of images, changing the number of frames of images, or the like.

Moreover, in this embodiment, the condition for changing the output mode and the degree of changing the output mode of the image can be customized by a user.

In this embodiment, the image output apparatus may be any apparatus that can output an image, such as a television, a player of a storage medium (an optical disk, a hard disk, etc.), or a photograph display apparatus.

Figure 2:
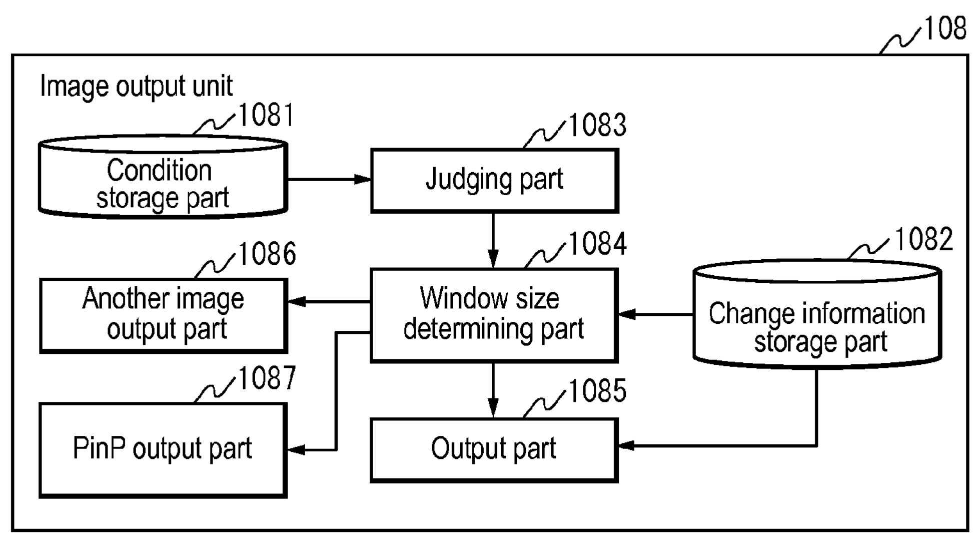
FIG. 2 is a block diagram of an image output unit in this embodiment.

FIG. 1 is a block diagram of an image output apparatus 1 in this embodiment. FIG. 2 is a block diagram of an image output unit 108 forming the image output apparatus 1.

The image output apparatus 1 includes an input video storage unit 101, a data broadcast receiving unit 102, an input image acquiring unit 103, a display attribute value acquiring unit 104, a target attribute value acquiring unit 105, an attribute value acquiring unit 106, a difference information acquiring unit 107, the image output unit 108, an accepting unit 109, a condition changing unit 110, a change information changing unit 111, and a target attribute value changing unit 112.

The target attribute value acquiring unit 105 includes a target attribute value storage part 1051 and a target attribute value acquiring part 1052.

The image output unit 108 includes a condition storage part 1081, a change information storage part 1082, a judging part 1083, a window size determining part 1084, an output part 1085, an another image output part 1086, and a PinP output part 1087.

In the input video storage unit 101, input video can be stored. There is no limitation on the data format and the like of the input video. The input video is a group of two or more images. The input video is preferably video that can be divided into two or more chapters.

The data broadcast receiving unit 102 receives a data broadcast. The data broadcast receiving unit 102 is typically realized by a part that receives a broadcast.

The input image acquiring unit 103 acquires an input image. Herein, acquiring refers to receiving by broadcast, receiving by communication, reading from a storage medium, or the like. Furthermore, for example, the input image acquiring unit 103 receives an input image by broadcast. Furthermore, for example, the input image acquiring unit 103 sequentially reads each of two or more input images contained in the input video from the input video storage unit 101. Furthermore, the input image acquiring unit 103 typically acquires input video containing two or more input images. Herein, the input image is typically an image before image normalization.

The input image acquiring unit 103 may be realized by, for example, a broadcast receiving part, a data reading part, or the like.

The display attribute value acquiring unit 104 acquires one or more display attribute values, each of which is an attribute value of a display screen of the image output apparatus 1. The display attribute value is the screen size, the display screen type (e.g., liquid crystal, organic EL, plasma, etc.), or the like. The display attribute value is held in, for example, a storage medium (e.g., display attribute value storage unit (not shown)) of the image output apparatus 1.

The target attribute value acquiring unit 105 acquires one or more target attribute values. The target attribute value is an original attribute value of a subject contained in an input image (which may be considered to be an output image in this example). The target attribute value is, for example, a target size, which is an original size of the subject. Furthermore, the target attribute value is, for example, a target size that is an apparent size of the subject, as viewed from a camera position. That is to say, the target size refers to an actual size that is an original size of the subject, or an apparent size that is an original size of the subject, as viewed from a camera position. Furthermore, the target attribute value is, for example, target speed information, which is information on a target value relating to a movement speed of the subject. Furthermore, the target attribute value is, for example, target speed information, which is information on a target value relating to an apparent movement speed of the subject, as viewed from a camera position. That is to say, the target speed information refers to an actual movement speed that is an original speed of the subject, or an apparent movement speed that is an original speed of the subject, as viewed from a camera position. Furthermore, the target attribute value may be, for example, the color of the subject, the brightness of the subject, or the like. Furthermore, the subject may be referred to as an object. Furthermore, the subject is, for example, an animal such as a human or a dog, part of an animal such as a face of a human, a still life such as an automobile or an apple, part of a still life such as a keyboard of a personal computer, or the like.

Furthermore, for example, the target attribute value acquiring unit 105 acquires one or more target attribute values as follows. First, a subject identifier for identifying the type of subject (e.g., a human, a dog, an automobile, etc.) and a target attribute value may be stored in association with each other, and the target attribute value acquiring unit 105 may acquire the target attribute value from this information. Furthermore, second, a subject identifier for identifying the type of subject (e.g., a human, a dog, an automobile, etc.), an attribute identifier (e.g., a size, a movement speed, a brightness, etc.), and a target attribute value may be stored in association with each other, and the target attribute value acquiring unit 105 may acquire the target attribute value from this information. Furthermore, third, a target attribute value may be in association with an input image, and the target attribute value acquiring unit 105 may acquire the target attribute value based on this input image. Furthermore, fourth, a target attribute value and a subject identifier may be in association with an input image, and the target attribute value acquiring unit 105 may acquire the target attribute value of a subject identified with the subject identifier from this input image. Furthermore, fifth, for example, the target attribute value acquiring unit 105 may read an actual size of a subject stored in a storage medium (not shown), and calculate a target size based on the actual size and information indicating a camera position managed in a pair with the input image. Herein, the information indicating a camera position refers to, for example, information indicating a distance between the camera and the subject. Furthermore, sixth, the target attribute value acquiring unit 105 may acquire, for example, target speed information stored in a storage medium (not shown). Furthermore, seventh, the target attribute value acquiring unit 105 may acquire, for example, target speed information managed in a pair with the input image. Moreover, eighth, the target attribute value acquiring unit 105 may read, for example, a movement speed of a subject stored in a storage medium (not shown), and calculate a target movement distance (length of movement on the screen) per unit time based on the movement speed and information indicating a camera position managed in a pair with the input image.

In the target attribute value storage part 1051, a subject identifier for identifying the type of subject and a target attribute value can be stored in association with each other. Furthermore, in the target attribute value storage part 1051, a subject identifier, an attribute identifier, and a target attribute value may be stored in association with each other.

The target attribute value acquiring part 1052 acquires one or more target attribute values. The method of the target attribute value acquiring part 1052 for acquiring the target attribute value is the same as the above-described method of the target attribute value acquiring unit 105 for acquiring the target attribute value.

The attribute value acquiring unit 106 acquires one or more attribute values of a subject contained in an output image. The output image is an image formed using the input image. The output image may be the same as the input image, or may be an image obtained by performing some sort of processing on the input image. Herein, there is no limitation on the some sort of processing, and typical examples thereof include image processing, such as processing that changes image attributes such as luminance or lightness and resolution creation processing (techniques described in Japanese Patent Nos. 2825482 and 3072306).

For example, the attribute value acquiring unit 106 acquires a size of a subject contained in an output image formed using the input image. In this case, for example, the attribute value acquiring unit 106 operates as follows. First, the attribute value acquiring unit 106 recognizes a predetermined type of subject (e.g., a human face) that is contained in an output image. Herein, the technique for recognizing a face in an image is a known art, and, thus, a detailed description thereof has been omitted. Next, the attribute value acquiring unit 106 acquires the number of pixels in the vertical and horizontal directions of a rectangular region containing the subject. Furthermore, the size (e.g., 100 inches, 65 inches, etc.) of the screen frame of the image output apparatus 1 and the number of pixels in the vertical and horizontal directions are acquired from a storage medium (screen frame size storage unit (not shown)). Then, the attribute value acquiring unit 106 calculates the vertical and horizontal sizes of the subject in the case where the output image is output to the screen frame, based on the number of pixels in the vertical and horizontal directions of the rectangular region, the size of the screen frame, and the number of pixels of the screen frame. Herein, the size of the screen frame is acquired typically by the display attribute value acquiring unit 104, but may be acquired by the attribute value acquiring unit 106.

Furthermore, for example, the attribute value acquiring unit 106 acquires speed information relating to a movement speed of a subject contained in output images formed using the input images. In this case, for example, the attribute value acquiring unit 106 operates as follows. That is to say, for example, the attribute value acquiring unit 106 acquires the number of pixels by which the subject moves per unit time, from two or more successive input images or two or more successive output images. Furthermore, the size (e.g., 100 inches, 65 inches, etc.) of the screen frame of the image output apparatus 1 and the number of pixels in the vertical and horizontal directions are acquired from a storage medium (screen frame size storage unit (not shown)). Then, the actual movement speed of the subject is calculated based on the number of pixels by which the subject moves per unit time, the size of the screen frame, and the number of pixels in the vertical and horizontal directions of the screen frame. Herein, it will be appreciated that there is no limitation on the method for calculating the speed.

Furthermore, for example, the attribute value acquiring unit 106 may acquire a representative luminance value such as an average luminance or a median luminance of pixels forming an output image formed using the input image. Furthermore, for example, the attribute value acquiring unit 106 may acquire a representative lightness value such as an average lightness or a median lightness of pixels forming an output image. Furthermore, for example, the attribute value acquiring unit 106 may acquire a representative luminance value and a representative lightness value of pixels forming a subject contained in an output image formed using the input image.

The difference information acquiring unit 107 acquires one or more pieces of difference information indicating a difference between the one or more target attribute values acquired by the target attribute value acquiring unit 105 and the one or more attribute values acquired by the attribute value acquiring unit 106. The difference information may be information indicating a proportion between the one or more target attribute values and the one or more attribute values acquired by the attribute value acquiring unit 106. That is to say, the difference information may be any information relating to a difference between the target attribute value and the attribute value acquired by the attribute value acquiring unit 106. Furthermore, for example, the difference information acquiring unit 107 may acquire size difference information, which is difference information indicating a difference between the target size acquired by the target attribute value acquiring unit 105 and the subject size acquired by the attribute value acquiring unit 106. Furthermore, the difference information acquiring unit 107 may acquire speed difference information, which is difference information indicating a difference between the target speed information acquired by the target attribute value acquiring unit 105 and the speed information acquired by the attribute value acquiring unit 106. Furthermore, the difference information may be information indicating whether or not there is a difference.

If the one or more pieces of difference information do not satisfy a predetermined condition, the image output unit 108 changes the output mode of the output image formed using the input image, and performs output. Furthermore, if a difference between the one or more target attribute values and the one or more attribute values is so large that the one or more pieces of difference information do not satisfy a predetermined condition, the image output unit 108 typically changes the output mode of the output image formed using the input image, so as to reduce the difference between the one or more target attribute values and the one or more attribute values acquired by the attribute value acquiring unit 106, and performs output. Furthermore, if the one or more pieces of difference information do not satisfy a predetermined condition, the image output unit 108 may form and output an output image obtained by changing predetermined one or more attribute values of the input image. Furthermore, it is preferable that the manner of the image output unit 108 for changing the output mode varies depending on the one or more display attribute values. In this specification, it will be appreciated that "in the case of not satisfying a condition" may be restated as "in the case of satisfying a condition" by replacing the condition with its opposite information (e.g., by replacing the condition "variable A>constant N" with the condition "variable A ≤constant N").

Furthermore, if the one or more pieces of difference information do not satisfy a predetermined condition, the image output unit 108 changes the output mode of the output image formed using the input image, according to the change information, and performs output.

Herein, "manner for changing the output mode varies" refers to, for example, making the window size different, making the maximum value of average luminance different, making the number of frames that are to be output per unit time different, or making the reproduction speed different.

Furthermore, the output is a concept that includes display on a display screen, projection using a projector, transmission to an external apparatus (typically, a display apparatus), accumulation in a storage medium, delivery of a processing result to another processing apparatus or another program, and the like.

Furthermore, the predetermined one or more attribute values refer to, for example, the brightness of an input image, the reproduction speed of two or more input images, the number of fields of two or more input images that are to be output per unit time, or the like.

The image output unit 108 may be considered to include or not to include an output device, such as a display screen or a loudspeaker. The image output unit 108 may be realized, for example, by driver software for an output device, a combination of driver software for an output device and the output device, or the like.

In the condition storage part 1081, a predetermined condition is stored. The predetermined condition is a condition relating to the difference information. In the condition storage part 1081, a predetermined condition may be held for each display attribute value such as the screen size. Herein, the predetermined condition may be the condition that the target attribute value is the same as the acquired attribute value. In this case, the condition storage part 1081 is not necessary.

Furthermore, the predetermined condition is, for example, the condition that "the attribute value acquired by the attribute value acquiring unit 106 matches the target attribute value", that "the proportion between the target size and the size is 2 or less", that "the difference between the speed indicated by the target speed information and the speed acquired by the attribute value acquiring unit 106 is 50 m/sec or less", that "the difference between the target average luminance that is a target attribute value and the average luminance acquired by the attribute value acquiring unit 106 is n or less (n is a constant)", or the like.

In the change information storage part 1082, change information can be stored. The change information is a degree of changing the output mode of the output image. Herein, the degree of change refers to, for example, a degree of changing the window size, an allowable range of the human movement speed, an allowable range of the brightness, or the like. The change information may be a name of a function, a name of a method, a function, a method, or the like for changing the output mode of the output image. Furthermore, the change information is, for example, "20 cm ≤ human face size ≤50 cm", "human movement speed≤15 m/sec", "average luminance value of the screen ≤n (n is a constant)", or the like. Furthermore, the change information may be held for each display attribute value such as the screen size. For example, the change information may be "(screen size: up to 50 inches, 20 cm≤human face size≤50 cm) (screen size: 51 to 80 inches, 20 cm≤human face size≤60 cm) (screen size: 81 to 100 inches, 20 cm≤human face size ≤80 cm)", "(screen size: up to 50 inches, human movement speed ≤15 m/sec) (screen size: 51 to 80 inches, human movement speed ≤20 m/sec) (screen size: 81 to 100 inches, human movement speed ≤25 m/sec)", or the like. The change information may be information on the target attribute value or part of the target attribute value. In this case, the change information storage part 1082 is not necessary.

The judging part 1083 judges whether or not the one or more pieces of difference information satisfy the predetermined condition stored in the condition storage part 1081.

If the judging part 1083 judges that the one or more pieces of difference information do not satisfy the predetermined condition, the window size determining part 1084 determines the size of a window to which an output image is to be output. The window size determining part 1084 determines the size of a window to which an output image is to be output, so as to match the change information. Furthermore, the window size determining part 1084 determines the size of a window to which an output image is to be output, so as to satisfy the target attribute value.

The output part 1085 outputs an output image to a window (hereinafter, which may be referred to as a "main region" as appropriate) according to the size of the window determined by the window size determining part 1084.

If the size of the window is smaller than that of the screen frame, the another image output part 1086 outputs an image different from the output image, to a second region different from the region (main region) of the window to which the output image is to be output. The image different from the output image is, for example, a stroboscopic image, a data broadcast, an image representing each of the two or more chapters contained in the input video, or the like. Herein, the stroboscopic image refers to one or more output images that were output at previous time points temporally continuous with the output image that is being currently output by the output part 1085. Furthermore, the image different from the output image is, for example, an image obtained by performing image processing different from that performed on the output image, on the same input image from which the output image that is to be output to the window is formed. Herein, the screen frame is the screen frame of the image output apparatus 1.

If the size of the window determined by the window size determining part 1084 is larger than that of the screen frame of the image output apparatus 1, the PinP output part 1087 outputs part of the output image to the screen frame, and outputs an image obtained by reducing the output image, to a window smaller than the screen frame. That is to say, the PinP output part 1087 performs PinP (Picture in Picture) output. The PinP output part 1087 outputs part of the output image in a large size, to a large screen of PinP, and outputs the entire output image in a reduced size, to a small window.

The output part 1085, the another image output part 1086, and the PinP output part 1087 may be considered to include or not to include an output device, such as a display screen. The output part 1085 and the like may be realized, for example, by driver software for an output device, a combination of driver software for an output device and the output device, or the like.

The accepting unit 109 accepts instructions, information, or the like from a user. The instructions or information refers to, for example, a change instruction, which is an instruction to change the predetermined condition, or change information. Furthermore, the accepting unit 109 may accept a target attribute value change instruction to change the target attribute value. Herein, accepting is a concept that includes accepting of information input from an input device such as a remote controller, a keyboard, a mouse, or a touch panel, receiving of information transmitted via a wired or wireless communication line, and accepting of information read from a storage medium such as an optical disk, a magnetic disk, or a semiconductor memory.

As an input part of the instructions, information, or the like, any part may be used such as a remote controller, a keyboard, a mouse, a menu screen, and the like. The accepting unit 109 may be realized by a device driver for an input part such as a remote controller or a keyboard, or control software for a menu screen, for example.

The condition changing unit 110 changes the predetermined condition in the condition storage part 1081, according to the change instruction.

The change information changing unit 111 changes the change information in the change information storage part 1082, according to the change information accepted by the accepting unit 109.

The target attribute value changing unit 112 changes the target attribute value in the target attribute value storage part 1051, according to the target attribute value change instruction accepted by the accepting unit 109.

The input video storage unit 101, the target attribute value storage part 1051, the condition storage part 1081, and the change information storage part 1082 are preferably a non-volatile storage medium, but may be realized also by a volatile storage medium. There is no limitation on the procedure in which the input video and the like are stored in the input video storage unit 101 and the like. For example, the input video and the like may be stored in the input video storage unit 101 and the like via a storage medium, the input video and the like transmitted via a communication line or the like may be stored in the input video storage unit 101 and the like, or the input video and the like input via an input device may be stored in the input video storage unit 101 and the like.

The display attribute value acquiring unit 104, the target attribute value acquiring unit 105, the attribute value acquiring unit 106, the difference information acquiring unit 107, the condition changing unit 110, the change information changing unit 111, the target attribute value acquiring part 1052, the judging part 1083, the window size determining part 1084, the condition changing unit 110, the change information changing unit 111, and the target attribute value changing unit 112 may be realized typically by an MPU, a memory, or the like. Typically, the processing procedure of the display attribute value acquiring unit 104 and the like is realized by software, and the software is stored in a storage medium such as a ROM. Note that the processing procedure may be realized also by hardware (a dedicated circuit).

Next, an operation of the image output apparatus 1 will be described with reference to a flowchart in FIG. 3.

(Step S301) The input image acquiring unit 103 acquires one or at least two input images.

(Step S302) The input image acquiring unit 103 or another part (not shown) forms one or more output images from the one or more input images acquired in step S301. Herein, if the output image is the same as the input image, no processing is performed in this step. Furthermore, it is preferable that, in this step, the output image is acquired by performing predetermined image processing on the input image.

(Step S303) The attribute value acquiring unit 106 detects a predetermined subject (e.g., a person, a human face, an animal, etc.) from the one or more output images.

(Step S304) The display attribute value acquiring unit 104 judges whether or not the predetermined subject has been detected in step S303. If the subject has been detected, the procedure advances to step S305, and, if the subject has not been detected, the procedure advances to step S315.

(Step S305) The display attribute value acquiring unit 104 acquires one or more display attribute values of the image output apparatus 1.

(Step S306) The attribute value acquiring unit 106 acquires one or more attribute values of the subject contained in the one or more output images. Herein, the one or more attribute values of the subject also may be attribute values of the entire output image.

(Step S307) The target attribute value acquiring unit 105 acquires one or more target attribute values.

(Step S308) The difference information acquiring unit 107 substitute 1 for a counter i.

(Step S309) The difference information acquiring unit 107 judges whether or not there is an ith attribute value in the one or more attribute values acquired in step S306 or the one or more target attribute values acquired in step S307. If there is the ith attribute value, the procedure advances to step S310, and, if there is not the ith attribute value, the procedure advances to step S315.

(Step S310) The difference information acquiring unit 107 acquires difference information between the ith attribute value acquired in step S306 and the ith target attribute value acquired in step S307.

(Step S311) The judging part 1083 forming the image output unit 108 acquires a condition corresponding to the ith attribute value, from the condition storage part 1081. Then, the judging part 1083 judges whether or not the difference information acquired in step S310 matches the acquired condition. If the difference information matches the condition, the procedure advances to step S314, and, if the difference information does not match the condition, the procedure advances to step S312.

(Step S312) The image output unit 108 acquires change information corresponding to the ith attribute value. Herein, the image output unit 108 may acquire the change information from the target attribute value.

(Step S313) The image output unit 108 changes an output mode of the one or more output images, according to the change information acquired in step S312.

(Step S314) The difference information acquiring unit 107 increments the counter i by 1. The procedure returns to step S309.

(Step S315) The image output unit 108 outputs the output image whose output mode has been changed. The procedure is ended.

Figure 3:
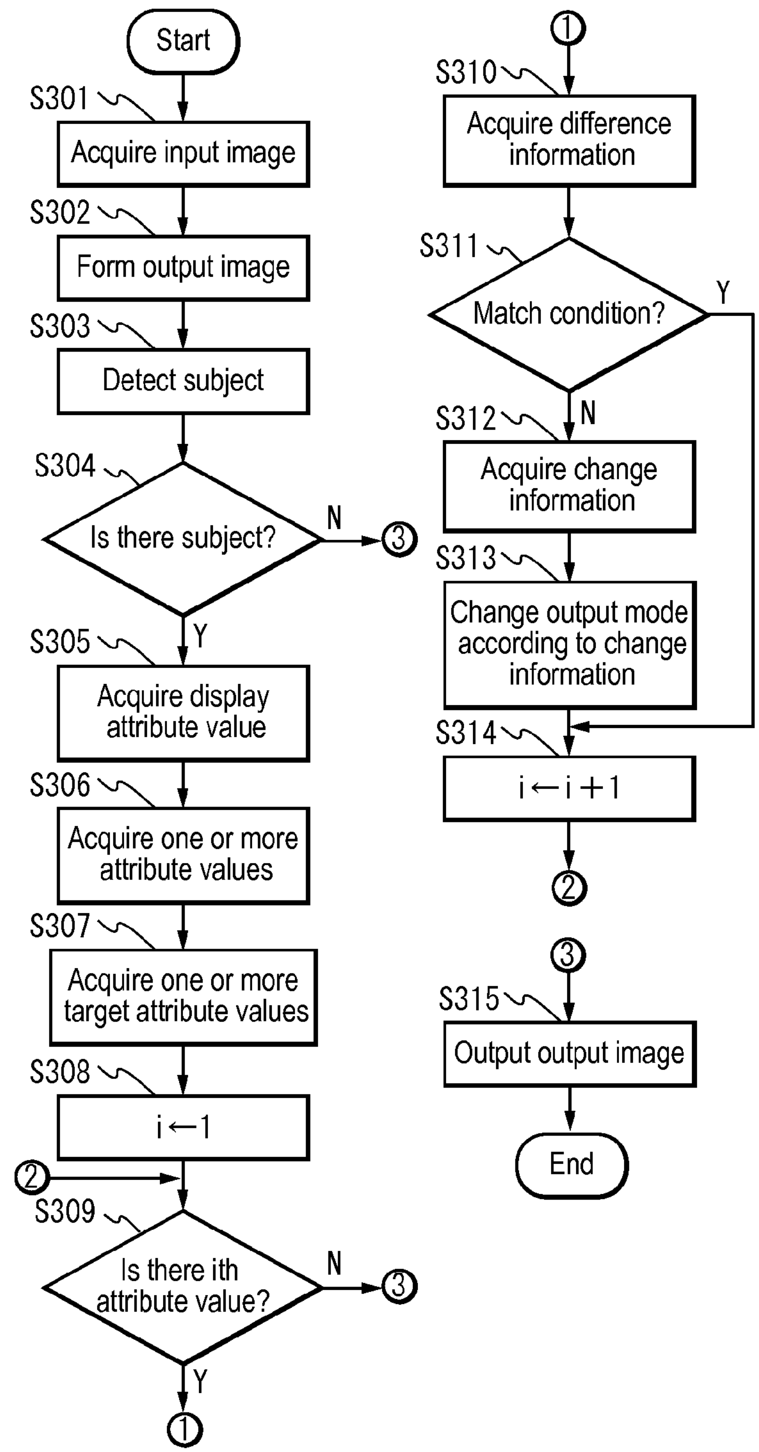
FIG. 3 is a flowchart illustrating an operation of the image output apparatus in this embodiment.

Herein, in the flowchart in FIG. 3, it is preferable that, if the size of the window is smaller than that of the screen frame, the another image output part 1086 outputs an image different from the output image, to a second region different from the region of the window to which the output image is to be output.

Furthermore, in the flowchart in FIG. 3, it is preferable that, if the size of the window determined by the window size determining part 1084 is larger than that of the screen frame of the image output apparatus 1, the PinP output part 1087 outputs part of the output image to the screen frame, and outputs an image obtained by reducing the output image, to a window smaller than the screen frame.

Moreover, in the flowchart in FIG. 3, if the accepting unit 109 accepts a change instruction, the condition changing unit 110 changes the predetermined condition in the condition storage part 1081, using a condition contained in the change instruction. Furthermore, if the accepting unit 109 accepts change information, the change information changing unit 111 changes the change information in the change information storage part 1082, using the change information accepted by the accepting unit 109. Moreover, if the accepting unit 109 accepts a target attribute value change instruction, the target attribute value changing unit 112 changes the target attribute value in the target attribute value storage part 1051, using a target attribute value contained in the target attribute value change instruction.

Next, specific operations of the image output apparatus 1 in this embodiment will be described. Hereinafter, the description of specific operations of the image output apparatus 1 will be given using six specific examples.

Now, it is assumed that the image output apparatus 1 is, for example, a television or an image reproducing apparatus that reads video from a storage medium.

Furthermore, it is assumed that a target attribute value management table shown in FIG. 4 is held in the target attribute value storage part 1051 of the target attribute value acquiring unit 105. In the target attribute value management table, one or more records having "ID", "subject identifier", "attribute identifier", and "target attribute value" can be stored. In this table, "ID" is information for identifying a record, "subject identifier" is information for specifying the type of subject, and "attribute identifier" is information for specifying the type of target attribute value. In FIG. 4, the record of "ID=1" indicates that the vertical size (the target attribute value) that a human face in an output image has to satisfy is 10 cm or more and 50 cm or less. Furthermore, the record of "ID=2" indicates that the target attribute value of a vehicle size (horizontal direction) is 200 cm or more. Furthermore, the record of "ID=3" indicates that the target attribute value of a movement speed of a natural object that is still in nature is 30 cm/sec or less. Furthermore, the record of "ID=4" indicates that the target attribute value of a movement speed of all moving subjects (speed: greater than 0 cm/sec) is 1 cm/sec or more. Furthermore, the record of "ID=5" indicates that the target attribute value of a representative luminance value of all pixels on the screen is n1 or less. Moreover, the record of "ID=6" indicates that the target attribute value of a representative luminance value of all pixels on the screen is n2 or more. Herein, the representative luminance value refers to a value representing the luminance of all pixels on the screen, and examples thereof include an average value (a simple average value, a weighted average value, etc.), a median, and the like of the luminance.

SPECIFIC EXAMPLE 1

Specific Example 1 shows a case in which, if the size of a subject in an image is too large to satisfy a predetermined condition, the size of a window to which the image is to be output is made smaller than the size of the screen frame, and the image is output to this window.

Now, it is assumed that the image output apparatus 1 has a screen frame with a size of 200 inches and an aspect ratio of 16:9. Furthermore, the 200-inch screen frame has a horizontal length (width) of 442.8 cm and a vertical length (height) of 249.1 cm. Also, it is assumed that such display attribute values are stored in advance in the display attribute value acquiring unit 104.

Furthermore, it is assumed that the condition that "the vertical size of a human face satisfies the target attribute value" is stored in the condition storage part 1081 of the image output unit 108.

Moreover, it is assumed that "change_window_size" is stored in the change information storage part 1082 of the image output unit 108. Here, "change_window_size" is a function (method) for calculating and returning the size of a window to which an image containing a person is to be output, using, as parameters, the vertical size of the human face before change, the target vertical size of the human face, and the size of the screen frame.

Figure 5:
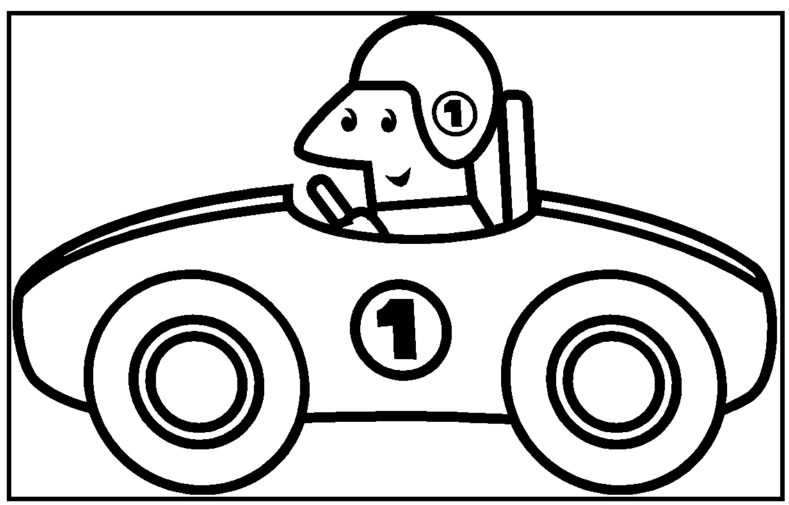
FIG. 5 is a view showing an image received by an input image acquiring unit 103 in this embodiment.

It is assumed that, in this situation, the input image acquiring unit 103 of the image output apparatus 1 receives an image shown in FIG. 5.

Next, the attribute value acquiring unit 106 detects a human face, which is a subject, from the image in FIG. 5. Herein, it is assumed that information (subject identifier "human face") of a target that is to be detected (subject) is held in advance in the attribute value acquiring unit 106. In this example, the attribute value acquiring unit 106 is a program or hardware for recognizing a face.

Next, the display attribute value acquiring unit 104 acquires the display screen size (screen frame: 200 inches, width: 442.8 cm, height: 249.1 cm) that has been stored in advance.

Next, it is assumed that the attribute value acquiring unit 106 acquires the size "0.33" of the detected human face (a proportion in the vertical direction in the image, in this example). Next, the attribute value acquiring unit 106 multiplies the height "249.1 cm" acquired by the display attribute value acquiring unit 104 and the acquired proportion in the image "0.33", thereby obtaining "82.203 cm".

Next, the target attribute value acquiring unit 105 acquires the attribute value identifier "size (vertical direction)" and the target attribute value "10 cm or more, 50 cm or less" corresponding to the subject identifier "human face" from the target attribute value management table in FIG. 4.

Next, the difference information acquiring unit 107 acquires difference information, which is a difference between the attribute value "82.203 cm" acquired by the attribute value acquiring unit 106 and the target attribute value "10 cm or more, 50 cm or less". The difference information in this example is information indicating that the attribute value acquired by the attribute value acquiring unit 106 is not contained in the range of the target attribute value.

Next, the judging part 1083 forming the image output unit 108 acquires the condition that "the vertical size of a human face satisfies the target attribute value" from the condition storage part 1081.

Next, the judging part 1083 judges that the acquired difference information does not match the acquired condition.

Next, the image output unit 108 acquires the change information "change_window_size". Then, the image output unit 108 executes "change_window_size (82.203 cm, 50 cm, 200 inches)", thereby acquiring the window size. Herein, the function "change_window_size" is a function for acquiring the window size on the 200-inch screen by reducing the size from "82.203 cm" to "50 cm".

Figure 6:
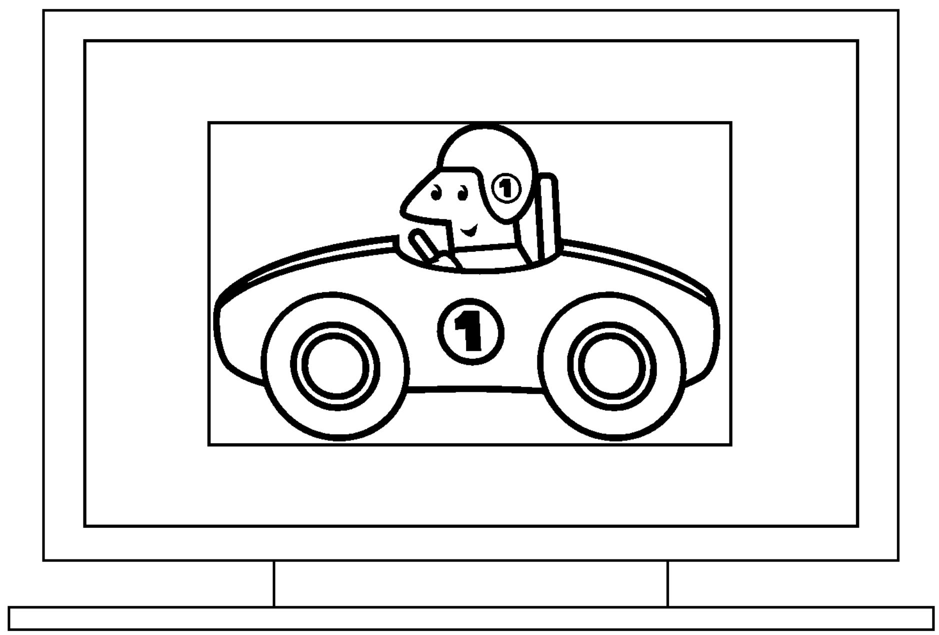
FIG. 6 is a view showing an output example in this embodiment.

Then, the image output unit 108 outputs the output image to the window smaller than the screen frame. FIG. 6 shows such an output example.

Furthermore, it is preferable that the image output unit 108 outputs an image such as the following, to the second region obtained by reducing the window size. The image that is to be output to such a second region is an image different from the image that is to be output to the window (main region). That is to say, the another image output part 1086 outputs, for example, a stroboscopic image or a data broadcast received by the data broadcast receiving unit 102, to the second region.

SPECIFIC EXAMPLE 2

Specific Example 2 shows a case in which, if the size of a subject in an image is too small to satisfy a predetermined condition, part of the image is output to the screen frame, and an image obtained by reducing the output image is output to a window smaller than the screen frame. That is to say, in this specific example, video is subjected to PinP output.

Now, it is assumed that the image output apparatus 1 has a screen frame with a size of 42 inches and an aspect ratio of 16:9. Furthermore, the 42-inch screen frame has a horizontal length (width) of 93.0 cm and a vertical length (height) of 52.3 cm. Also, it is assumed that such display attribute values are stored in advance in the display attribute value acquiring unit 104.

Furthermore, it is assumed that the condition that "the difference information is 30 cm or less" is stored in the condition storage part 1081 of the image output unit 108.

Moreover, it is assumed that "change_window_size" is stored in the change information storage part 1082 of the image output unit 108.

Figure 7:
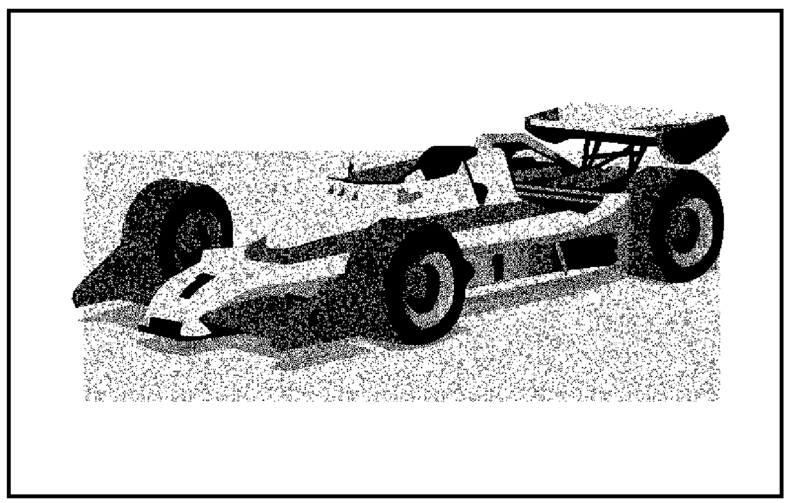
FIG. 7 is a view showing an image received by the input image acquiring unit 103 in this embodiment.

It is assumed that, in this situation, the input image acquiring unit 103 of the image output apparatus 1 receives an image shown in FIG. 7. Furthermore, it is assumed that "subject identifier: vehicle" is added to the data region of the image shown in FIG. 7.

Next, the attribute value acquiring unit 106 detects a vehicle, which is a subject, from the image in FIG. 5. Herein, the technique for detecting a specific object from an image is a known art, and, thus, a detailed description thereof has been omitted.

Next, the display attribute value acquiring unit 104 acquires the display screen size (screen frame: 42 inches, width: 93.0 cm, height: 52.3 cm) that has been stored in advance.

Next, it is assumed that the attribute value acquiring unit 106 acquires the size "0.9" of the detected vehicle (a proportion in the horizontal direction in the image, in this example). Next, the attribute value acquiring unit 106 multiplies the width "93.0 cm" acquired by the display attribute value acquiring unit 104 and the acquired proportion in the image "0.9", thereby obtaining "83.7 cm".

Next, the target attribute value acquiring unit 105 acquires the attribute value identifier "size (horizontal direction)" and the target attribute value "200 cm or more" corresponding to the subject identifier "vehicle" from the target attribute value management table in FIG. 4.

Next, the difference information acquiring unit 107 acquires difference information, which is a difference between the attribute value "83.7 cm" acquired by the attribute value acquiring unit 106 and the target attribute value "200 cm or more". It is assumed that the difference information in this example is "200-83.7=116.3 cm".

Next, the judging part 1083 forming the image output unit 108 acquires the condition that "the difference information is 30 cm or less" from the condition storage part 1081.

Next, the judging part 1083 judges that the acquired difference information "116.3 cm" does not match the acquired condition "the difference information is 30 cm or less".

Next, the image output unit 108 acquires the change information "change_window_size". Then, the image output unit 108 executes "change_window_size (116.3 cm, 200 cm, 42 inches)", thereby acquiring the window size (e.g., "72.2 inches"). Herein, the size "72.2 inches" of the screen frame corresponds to width: 159.9 cm, height: 89.9 cm.

Figure 8:
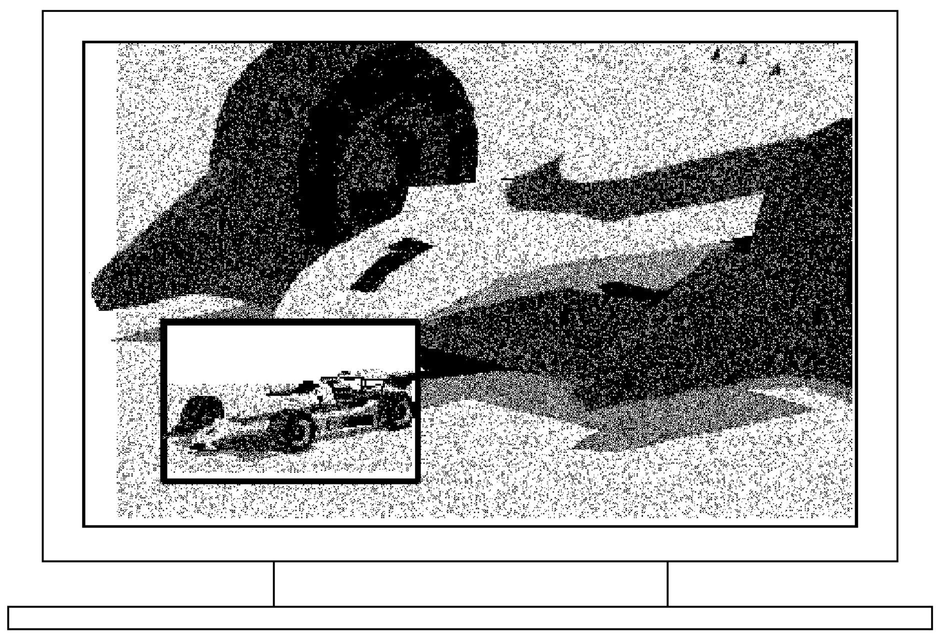
FIG. 8 is a view showing an output example in this embodiment.

Then, the PinP output part 1087 of the image output unit 108 enlarges the image in FIG. 7 so as to match the window size (width 159.9 cm, height: 89.9 cm), and outputs part of the enlarged image to the entire screen frame. Furthermore, the PinP output part 1087 outputs the entire image in FIG. 7 to the window having a predetermined size (size smaller than that of the screen frame). FIG. 8 shows such an output example. In FIG. 8, a PinP image has been output.

SPECIFIC EXAMPLE 3

Specific Example 3 shows a case in which, if the movement speed of a subject in images is too fast to satisfy a predetermined condition, the size of a window to which the images are to be output is made smaller than the size of the screen frame, and the images are output to this window.

Now, it is assumed that the image output apparatus 1 has a screen frame with a size of 200 inches and an aspect ratio of 16:9. Furthermore, the 200-inch screen frame has a horizontal length (width) of 442.8 cm and a vertical length (height) of 249.1 cm. Also, it is assumed that such display attribute values are stored in advance in the display attribute value acquiring unit 104.

Furthermore, it is assumed that the condition that "the speed of the natural object satisfies the target attribute value" is stored in the condition storage part 1081 of the image output unit 108.

Moreover, it is assumed that "change_window_size" is stored in the change information storage part 1082 of the image output unit 108.

Figure 9:
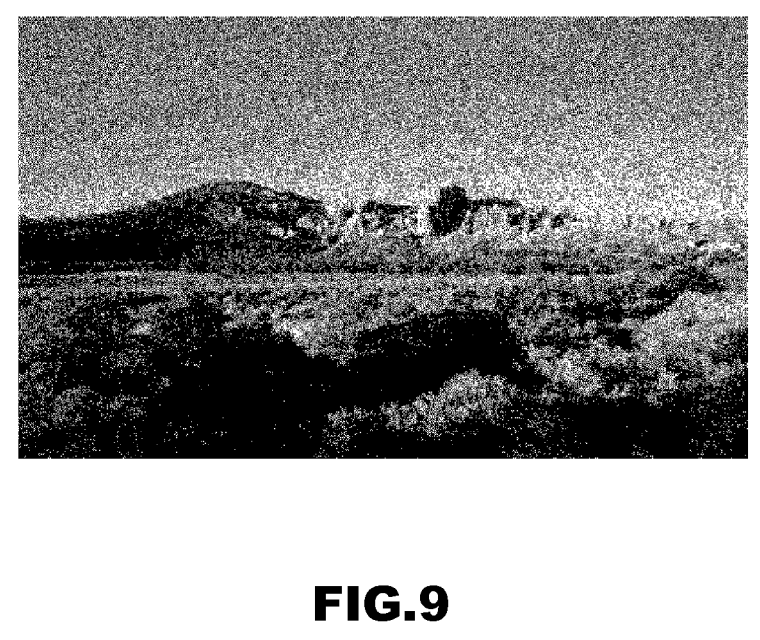

It is assumed that, in this situation, the input image acquiring unit 103 of the image output apparatus 1 reads two or more images of a moving natural object containing an image shown in FIG. 9, from the input video storage unit 101. Herein, it is assumed that the video stored in the input video storage unit 101 is, for example, video having data in DVD (digital versatile disc) format and divided into chapters.

Next, it is assumed that the attribute value acquiring unit 106 acquires the movement speed "60 cm/sec" of the subject in the images from the two or more images read by the input image acquiring unit 103. Herein, it is preferable that the attribute value acquiring unit 106 reads in advance the video in the input video storage unit 101 before outputting the output images, and acquires the speed of the subject in the two or more images.

Next, the target attribute value acquiring unit 105 acquires the attribute value identifier "speed" and the target attribute value "30 cm/sec or less" corresponding to the subject identifier "natural object" from the target attribute value management table in FIG. 4.

Next, the difference information acquiring unit 107 acquires difference information, which is a difference between the attribute value "60 cm/sec" acquired by the attribute value acquiring unit 106 and the target attribute value "30 cm/sec or less". The difference information in this example is information indicating that the attribute value acquired by the attribute value acquiring unit 106 does not satisfy the target attribute value.

Next, the judging part 1083 forming the image output unit 108 acquires the condition that "the movement speed of the subject satisfies the target attribute value" from the condition storage part 1081.

Next, the judging part 1083 judges that the acquired difference information does not match the acquired condition.

Next, the image output unit 108 acquires the change information "change_window_size". Then, the window size determining part 1084 of the image output unit 108 determines the window size to be "$\frac{30}{60}=\frac{1}{2}$" of the screen frame such that the movement speed "60 cm/sec" matches the target attribute value "30 cm/sec or less". Then, the window size determining part 1084 obtains the window size "100 inches". Herein, the obtained window size is width: 221.4 cm, height: 124.5 cm.

Figure 10:
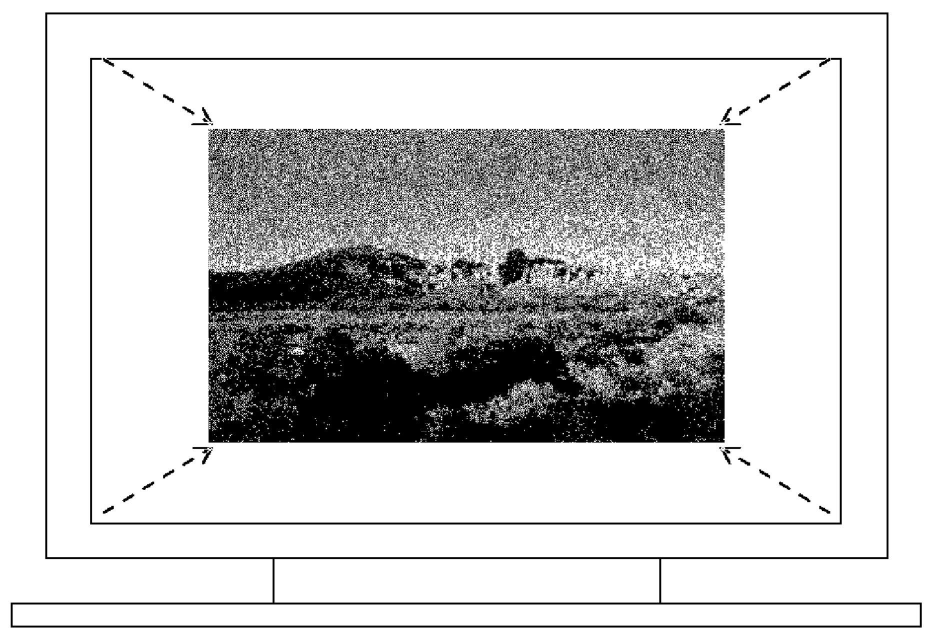
FIG. 10 is a view showing an output example in this embodiment.

Then, the image output unit 108 outputs the output images to the window smaller than the screen frame. FIG. 10 shows such an output example.

Figure 11:
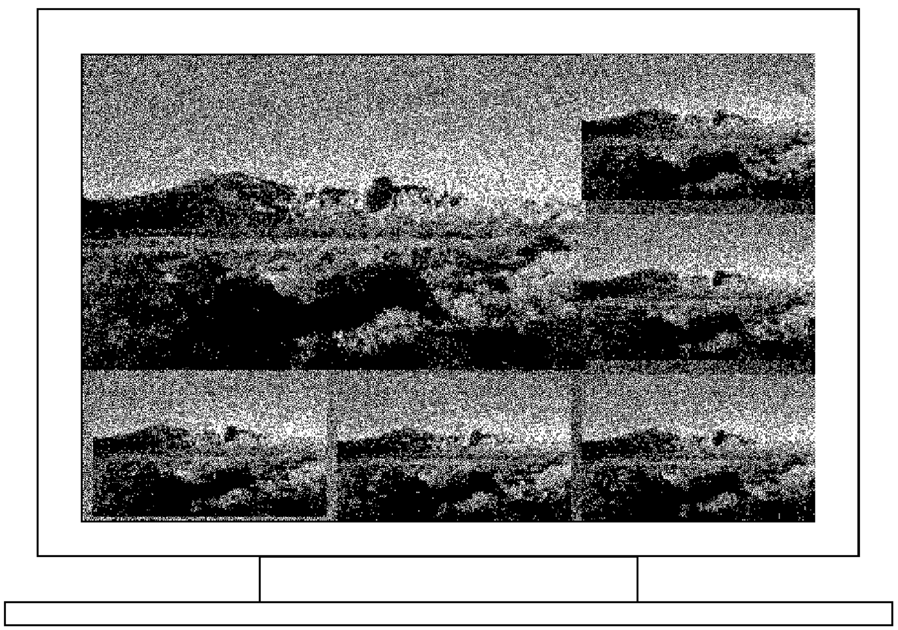
FIG. 11 is a view showing an output example in this embodiment.
Figure 12:
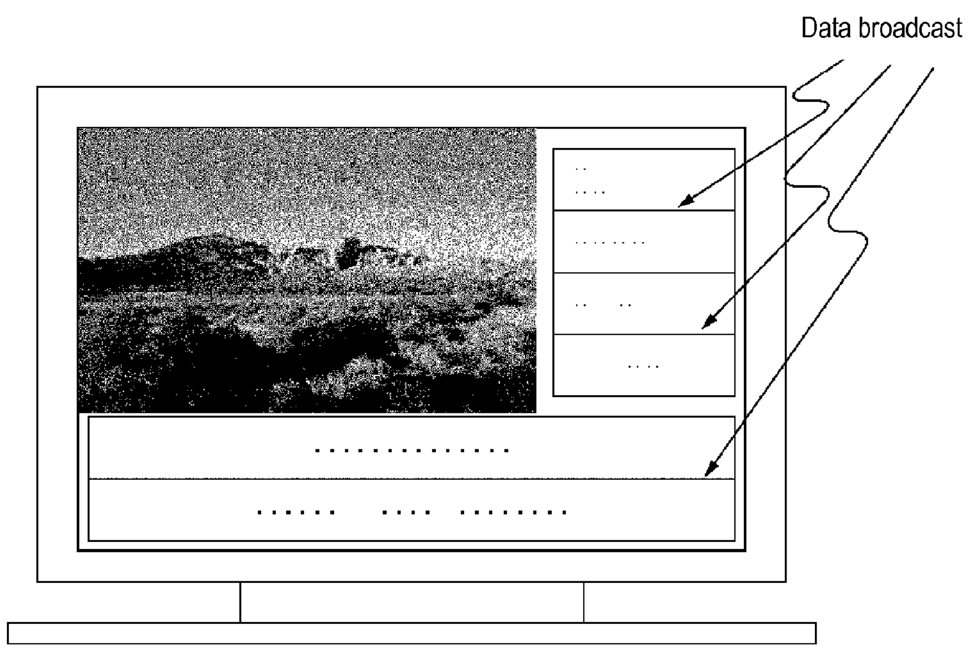
FIG. 12 is a view showing an output example in this embodiment.
Figure 13:
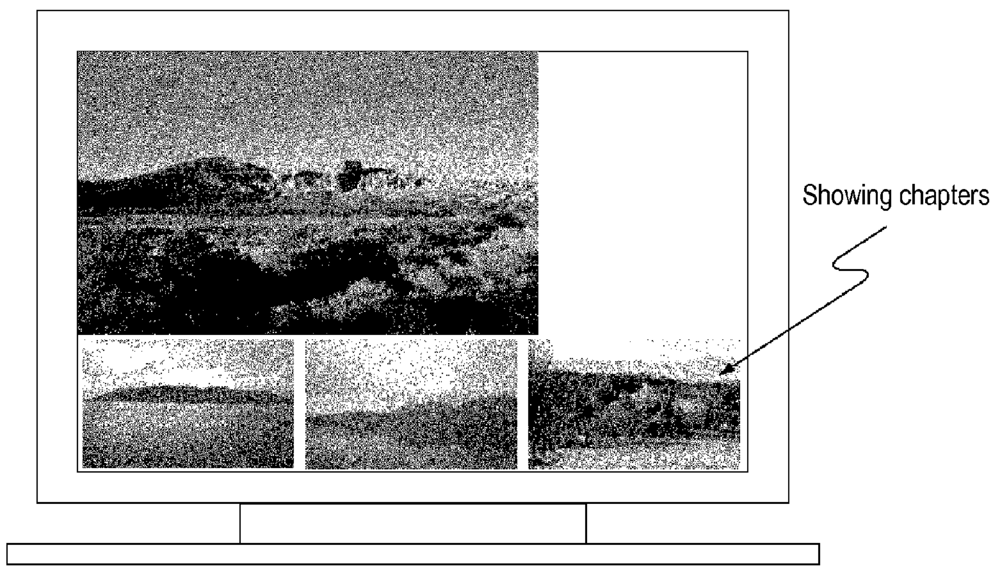
FIG. 13 is a view showing an output example in this embodiment.

Furthermore, it is preferable that the image output unit 108 outputs images such as the following, to the second region obtained by reducing the window size. That is to say, the another image output part 1086 may perform stroboscopic output of two or more successive images that were previously output to the main region, for example, as shown in FIG. 11. Furthermore, the another image output part 1086 may output the data broadcast received by the data broadcast receiving unit 102, for example, as shown in FIG. 12. Moreover, the another image output part 1086 may show chapters in the video in the input video storage unit 101, for example, as shown in FIG. 13.

SPECIFIC EXAMPLE 4

Specific Example 4 shows a case in which, if the movement speed of a subject in images is too slow to satisfy a predetermined condition, the reproduction speed is changed such that the speed is made to match or approach the actual speed, and the images are output at this reproduction speed.

Now, it is assumed that the image output apparatus 1 has a screen frame with a size of 42 inches and an aspect ratio of 16:9. Furthermore, the 42-inch screen frame has a horizontal length (width) of 93.0 cm and a vertical length (height) of 52.3 cm. Also, it is assumed that such display attribute values are stored in advance in the display attribute value acquiring unit 104.

Furthermore, it is assumed that the condition that "the speed satisfies the target attribute value" is stored in the condition storage part 1081 of the image output unit 108.

Moreover, it is assumed that "change_speed" is stored in the change information storage part 1082 of the image output unit 108. The function "change_speed" is a function for determining the reproduction speed such that the movement of a subject matches a condition, using, as a parameter, a proportion between an ordinary reproduction speed and a movement speed.

Figure 14:
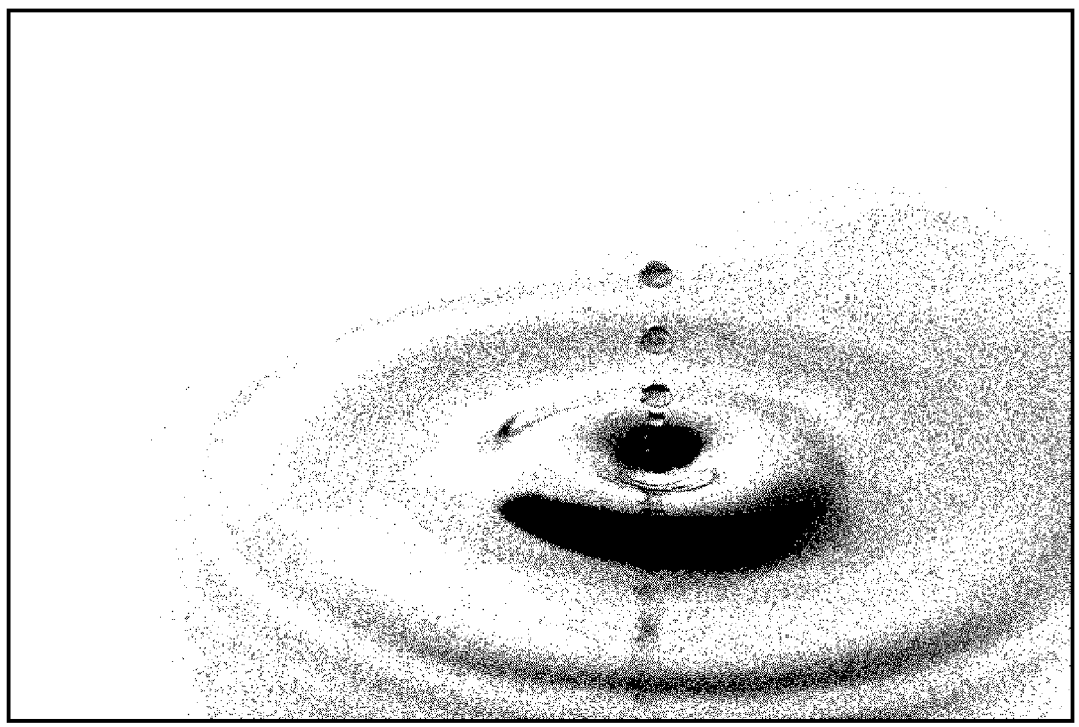
FIG. 14 is a view showing an output example in this embodiment.

It is assumed that, in this situation, the input image acquiring unit 103 of the image output apparatus 1 receives two or more images of a moving natural object containing an image shown in FIG. 14.

Next, it is assumed that the attribute value acquiring unit 106 acquires the movement speed "0.5 cm/sec" of the subject in the images from the two or more images read by the input image acquiring unit 103. Herein, it is assumed that the ordinary reproduction speed is "30 field/sec".

Next, the difference information acquiring unit 107 acquires the difference information "1:0.5=2:1 (twofold)", which is a difference between the attribute value "0.5 cm/sec" acquired by the attribute value acquiring unit 106 and the target attribute value "1 cm/sec or more".

Next, the judging part 1083 judges that the acquired difference information does not match the acquired condition.

Next, the image output unit 108 acquires the change information "change_speed". Then, the image output unit 108 executes the function "change_speed (30 field/sec, twofold)", thereby acquiring 60 field/sec.

Then, the image output unit 108 reproduces the output images at a reproduction speed of 60 field/sec. Herein, the output image is, for example, the image acquired by the input image acquiring unit 103.

SPECIFIC EXAMPLE 5

Specific Example 5 shows a case in which, if the brightness of an image is too high to satisfy a predetermined condition, an image obtained by reducing the luminance is output.

Now, it is assumed that a target attribute value management table shown in FIG. 15 is held in the target attribute value storage part 1051 of the target attribute value acquiring unit 105. In the target attribute value management table, one or more records having "ID", "display attribute value", "attribute identifier", and "target attribute value" are stored. In this table, "display attribute value" has "display screen type" and "size". Furthermore, "representative luminance value" of the attribute identifier is a representative value such as an average value, a median, or the like of the luminance of the entire image.

It is assumed that, in this situation, the input image acquiring unit 103 of the image output apparatus 1 receives one image.

Next, it is assumed that the attribute value acquiring unit 106 acquires the representative luminance value "CA" of the received image. Herein, this processing is a known art.

Next, the display attribute value acquiring unit 104 acquires the display screen type "liquid crystal" and the size "65 inches" that have been stored in advance.

Next, the target attribute value acquiring unit 105 acquires the target attribute value "$C1 \le X \le C3$" corresponding to the display screen type "liquid crystal" and the size "65 inches" from the target attribute value management table in FIG. 15.

Next, the difference information acquiring unit 107 acquires difference information, using the representative luminance value "CA" acquired by the attribute value acquiring unit 106 and the target attribute value "$C1 \le X \le C3$". It is assumed that the difference information in this example is information indicating that the attribute value "CA" acquired by the attribute value acquiring unit 106 is not contained in the range of the target attribute value "$C1 \le X \le C3$". That is to say, herein, it is assumed that "$C3 < CA$".

Next, the judging part 1083 forming the image output unit 108 acquires the condition that "the representative luminance value satisfies the target attribute value" from the condition storage part 1081.

Next, the judging part 1083 judges that the acquired difference information does not match the acquired condition.

Next, it is assumed that the image output unit 108 acquires the change information "change_brightness". Here, "change_brightness" is a function for changing the luminance of an image such that the representative luminance value matches a target luminance, using the target luminance as a parameter. Then, the image output unit 108 executes "change_brightness (C3)" on the received image, thereby acquiring an output image. That is to say, the image output unit 108 acquires an output image in which the luminance of the entire image has been increased.

Then, the image output unit 108 outputs the output image to the entire screen frame. In Specific Example 5, the attribute value acquiring unit 106 acquires a representative luminance value of the entire received image, but may acquire a representative luminance value of a subject in part of the received image.

SPECIFIC EXAMPLE 6

Specific Example 6 shows a case in which, if the brightness of an image is too low to satisfy a predetermined condition, an image obtained by increasing the luminance is output.

Now, it is assumed that the target attribute value management table shown in FIG. 15 is held in the target attribute value storage part 1051 of the target attribute value acquiring unit 105.

It is assumed that, in this situation, the input image acquiring unit 103 of the image output apparatus 1 receives one image.

Next, it is assumed that the attribute value acquiring unit 106 acquires the representative luminance value "CB" of the received image. Herein, this processing is a known art.

Next, the display attribute value acquiring unit 104 acquires the display screen type "organic EL" and the size "32 inches" that have been stored in advance.

Next, the target attribute value acquiring unit 105 acquires the target attribute value "C1≤X≤C6" corresponding to the display screen type "organic EL" and the size "32 inches" from the target attribute value management table in FIG. 15.

Next, the difference information acquiring unit 107 acquires difference information, using the representative luminance value "CB" acquired by the attribute value acquiring unit 106 and the target attribute value "C1≤X≤C6". It is assumed that the difference information in this example is information indicating that the attribute value "CB" acquired by the attribute value acquiring unit 106 is not contained in the range of the target attribute value "C1≤X≤C6". That is to say, herein, it is assumed that "CB<C1".

Next, the judging part 1083 forming the image output unit 108 acquires the condition that "the representative luminance value satisfies the target attribute value" from the condition storage part 1081.

Next, the judging part 1083 judges that the acquired difference information does not match the acquired condition.

Next, it is assumed that the image output unit 108 acquires the change information "change_brightness". Here, "change_brightness" is a function for changing the luminance of an image such that the representative luminance value matches a target luminance, using the target luminance as a parameter. Then, the image output unit 108 executes "change_brightness (C1)" on the received image, thereby acquiring an output image. That is to say, the image output unit 108 acquires an output image in which the luminance of the entire image has been reduced.

Then, the image output unit 108 outputs the output image to the entire screen frame. In Specific Example 6, the attribute value acquiring unit 106 acquires a representative luminance value of the entire received image, but may acquire a representative luminance value of a subject in part of the received image.

As described above, according to this embodiment, the problems for a user who is viewing the images can be reduced or eliminated.

More specifically, according to this embodiment, an attribute value of a subject in output images can be made to match or approach an actual attribute value, and, thus, the problems for a user who is viewing the images can be reduced or eliminated.

Furthermore, according to this embodiment, for example, the size of a window to which output images are to be output can be changed, and, thus, the problems for a user who is viewing the images can be reduced or eliminated.

Furthermore, according to this embodiment, the free space (second region) obtained by making the size of a window to which output images are to be output smaller than that of the screen frame can be effectively used.

Furthermore, according to this embodiment, if the size of the window is larger than that of the screen frame of the image output apparatus, part of the output image can be output to the screen frame, and an image obtained by reducing the output image can be output to a window smaller than the screen frame, and, thus, an attribute value of a subject in output images can be made to match or approach an actual attribute value, and the entire output images can be output.

Furthermore, according to this embodiment, the size of a subject in output images can be made to match or approach an actual size considering the camera position, and, thus, the problems for a user who is viewing the images can be reduced or eliminated.

Furthermore, according to this embodiment, the movement speed of a subject in output images can be made to match or approach an actual speed, and, thus, the problems for a user who is viewing the images can be reduced or eliminated.

Furthermore, according to this embodiment, the movement speed of a subject in output images can be made to match or approach an actual speed considering the camera position, and, thus, the problems for a user who is viewing the images can be reduced or eliminated.

Furthermore, according to this embodiment, the brightness (a luminance, a lightness, etc.) of an output image can be properly controlled. As a result, the problems for a user who is viewing the images can be reduced or eliminated.

Furthermore, according to this embodiment, the reproduction speed of output images can be properly controlled. As a result, the problems for a user who is viewing the images can be reduced or eliminated.

Furthermore, according to this embodiment, the number of frames of output images per unit time can be properly controlled. As a result, the problems for a user who is viewing the images can be reduced or eliminated.

Furthermore, according to this embodiment, output images properly matching an attribute value of a display screen on which a user views the images can be output. As a result, the problems for a user who is viewing the images can be reduced or eliminated.

Herein, in the specific examples of this embodiment, the target attribute value in the target attribute value storage part 1051, the condition in the condition storage part 1081, and the change information in the change information storage part 1082 cannot be customized. However, the accepting unit 109 may accept a change instruction, which is an instruction to change the condition. In this case, the condition changing unit 110 changes the predetermined condition according to the change instruction. Furthermore, the condition changing unit 110 may change the target attribute value according to the change instruction. Herein, it may be considered that the target attribute value also forms the predetermined condition. Furthermore, the accepting unit 109 may accept change information, which is a degree of changing the output mode of the output image. In this case, the change information changing unit 111 changes a degree of changing the output mode of the output image, according to the change information. Herein, it may be considered that the target attribute value also forms the change information.

Furthermore, in the specific examples of this embodiment, the camera position is not considered to calculate the size or the movement speed of a subject. However, it is preferable that the target attribute value acquiring unit 105 acquires a target size that is an apparent size of the subject contained in the input image, as viewed from a camera position. That is to say, the target attribute value acquiring unit 105 may obtain a new target attribute value, by modifying the target attribute value (size) in the target attribute value storage part 1051, using the camera position. That is to say, the target attribute value acquiring unit 105 may perform the modification such that the target attribute value (size) becomes smaller as the camera position (e.g., a distance between the subject and the camera) becomes larger. Furthermore, it is preferable that the target attribute value acquiring unit 105 acquires target speed information, which is information on a target value relating to an apparent movement speed of a subject contained in input images, as viewed from a camera position. That is to say, the target attribute value acquiring unit 105 may obtain a new target attribute value, by modifying the target attribute value (speed) in the target attribute value storage part 1051, using the camera position. That is to say, the target attribute value acquiring unit 105 may perform the modification such that the target attribute value (speed) becomes smaller as the camera position (e.g., a distance between the subject and the camera) becomes larger. Herein, for example, it is assumed that the information of the camera position (e.g., a distance between the subject and the camera) is present in association with an image.

Moreover, the processing in this embodiment may be realized using software. The software may be distributed by software download or the like. Furthermore, the software may be distributed in a form where the software is stored in a storage medium such as a CD-ROM. Note that the same is applied to other embodiments described in this specification. The software that realizes the image output apparatus 1 in this embodiment may be the following sort of program. Specifically, this program is a program for causing a computer to function as: an input image acquiring unit that acquires an input image; a target attribute value acquiring unit that acquires at least one target attribute value, which is an original attribute value of a subject contained in the input image; an attribute value acquiring unit that acquires at least one attribute value of the subject contained in an output image formed using the input image; a difference information acquiring unit that acquires at least one piece of difference information indicating a difference between the at least one target attribute value acquired by the target attribute value acquiring unit and the at least one attribute value acquired by the attribute value acquiring unit; and an image output unit that, in a case where the at least one piece of difference information does not satisfy a predetermined condition, changes an output mode of the output image formed using the input image, and performs output.

Furthermore, in this program, it is preferable to cause the computer to function such that, in a case where the difference between the at least one target attribute value and the at least one attribute value is so large that the at least one piece of difference information does not satisfy the predetermined condition, the image output unit changes the output mode of the output image formed using the input image, so as to reduce the difference between the at least one target attribute value and the at least one attribute value acquired by the attribute value acquiring unit, and performs output.

Furthermore, in this program, it is preferable to cause the computer to function such that the image output unit includes: a condition storage part in which the predetermined condition is stored; a judging part that judges whether or not the at least one piece of difference information satisfies the predetermined condition; a window size determining part that, in a case where the judging part judges that the at least one piece of difference information does not satisfy the predetermined condition, determines a size of a window to which the output image is to be output; and an output part that outputs the output image to the window having the size determined by the window size determining part.

Furthermore, in this program, it is preferable to cause the computer to function such that the image output unit further includes an another image output part that, in a case where the size of the window is smaller than that of a screen frame, outputs an image different from the output image, to a second region different from a region of the window to which the output image is to be output.

Furthermore, in this program, it is preferable to cause the computer to function such that the another image output part performs stroboscopic output to at least two regions obtained by dividing the second region.

Furthermore, in this program, it is preferable to cause the computer to function such that the computer is caused to further function as a data broadcast receiving unit that receives a data broadcast, and the another image output part outputs the data broadcast to the second region.

Furthermore, in this program, it is preferable to cause the computer to function such that the computer is caused to further function as an input video storage unit in which input video that can be divided into at least two chapters can be stored, the input image acquiring unit sequentially reads each of at least two input images contained in the input video from the input video storage unit, and the another image output part outputs an image representing each of the at least two chapters contained in the input video to the second region.

Furthermore, in this program, it is preferable to cause the computer to function such that the another image output part outputs, to the second region, an image obtained by performing image processing different from that performed on the output image, on the same input image from which the output image that is to be output to the window is formed.

Furthermore, in this program, it is preferable to cause the computer to function such that the image output unit further includes a PinP output part that, in a case where the size of the window determined by the window size determining part is larger than that of a screen frame of the image output apparatus, outputs part of the output image to the screen frame, and outputs an image obtained by reducing the output image, to a window smaller than the screen frame.

Furthermore, in this program, it is preferable to cause the computer to function such that the target attribute value acquiring unit acquires a target size, which is an original size of the subject contained in the input image, the attribute value acquiring unit acquires a size of the subject contained in the output image formed using the input image, and the difference information acquiring unit acquires size difference information, which is difference information indicating a difference between the target size acquired by the target attribute value acquiring unit and the subject size acquired by the attribute value acquiring unit.

Furthermore, in this program, it is preferable to cause the computer to function such that the target attribute value acquiring unit acquires a target size that is an apparent size of the subject contained in the input image, as viewed from a camera position, the attribute value acquiring unit acquires a size of the subject contained in the output image formed using the input image, and the difference information acquiring unit acquires size difference information, which is difference information indicating a difference between the target size acquired by the target attribute value acquiring unit and the subject size acquired by the attribute value acquiring unit.

Furthermore, in this program, it is preferable to cause the computer to function such that the target attribute value acquiring unit acquires target speed information, which is information on a target value relating to a movement speed of the subject contained in the input image, the attribute value acquiring unit acquires speed information relating to a movement speed of the subject contained in the output image formed using the input image, and the difference information acquiring unit acquires speed difference information, which is difference information indicating a difference between the target speed information acquired by the target attribute value acquiring unit and the speed information acquired by the attribute value acquiring unit.

Furthermore, in this program, it is preferable to cause the computer to function such that the target attribute value acquiring unit acquires target speed information, which is information on a target value relating to an apparent movement speed of the subject contained in the input image, as viewed from a camera position, the attribute value acquiring unit acquires speed information relating to a movement speed of the subject contained in the output image formed using the input image, and the difference information acquiring unit acquires speed difference information, which is difference information indicating a difference between the target speed information acquired by the target attribute value acquiring unit and the speed information acquired by the attribute value acquiring unit.

Furthermore, in this program, it is preferable to cause the computer to function such that, in a case where the at least one piece of difference information does not satisfy the predetermined condition, the image output unit forms and outputs an output image obtained by changing predetermined at least one attribute value of the input image.

Furthermore, in this program, it is preferable to cause the computer to function such that the input image acquiring unit acquires at least two input images, and the predetermined at least one attribute value is a reproduction speed of the at least two input images.

Furthermore, in this program, it is preferable to cause the computer to function such that the input image acquiring unit acquires at least two input images, and the predetermined at least one attribute value is the number of fields of the at least two input images that are to be output per unit time.

Furthermore, in this program, it is preferable to cause the computer to function such that the computer is caused to further function as a display attribute value acquiring unit that acquires at least one display attribute value, which is an attribute value of a display screen of the image output apparatus, and a manner of the image output unit for changing the output mode varies depending on the at least one display attribute value.

Furthermore, in this program, it is preferable to cause the computer to function such that the computer is caused to further function as: an accepting unit that accepts a change instruction, which is an instruction to change the predetermined condition; and a condition changing unit that changes the predetermined condition according to the change instruction.

Furthermore, in this program, it is preferable to cause the computer to function such that the computer is caused to further function as: an accepting unit that accepts change information, which is a degree of changing the output mode of the output image; and a change information changing unit that changes a degree of changing the output mode of the output image, according to the change information; and, in a case where the at least one piece of difference information does not satisfy a predetermined condition, the image output unit changes the output mode of the output image formed using the input image, according to the change information, and performs output.

Figure 16:
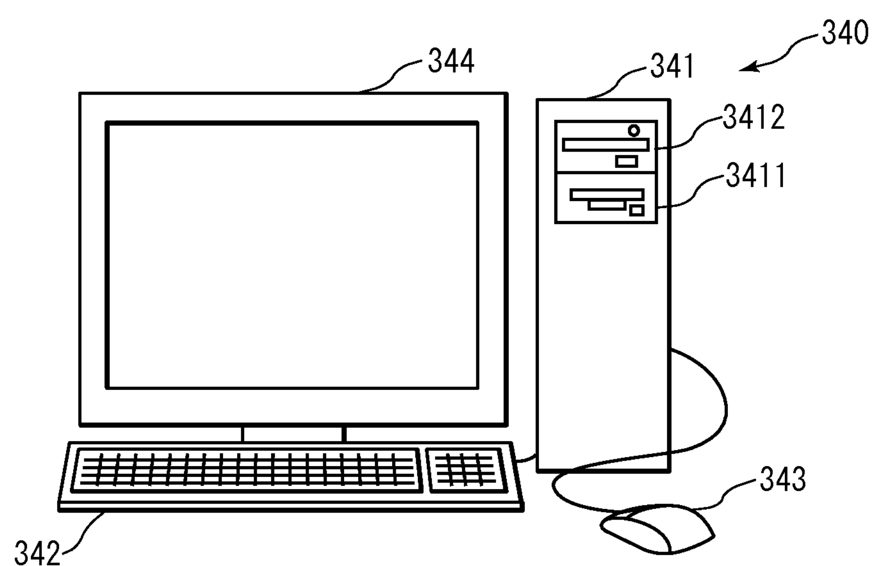
FIG. 16 is a schematic view of a computer system in this embodiment.
Figure 17:
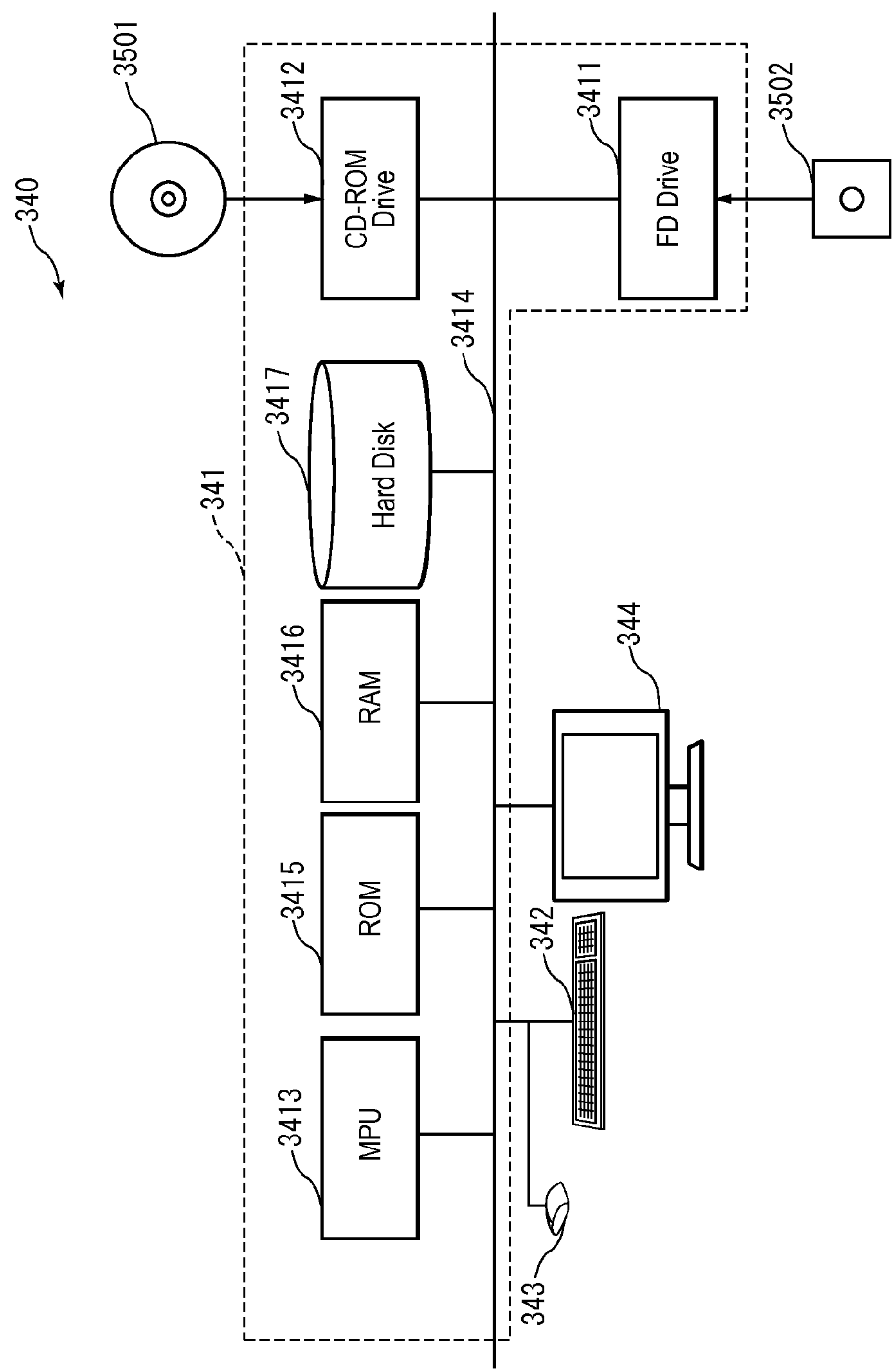
FIG. 17 is a block diagram of the computer system in this embodiment.

FIG. 16 shows the external appearance of a computer that executes the programs described in this specification to realize the image output apparatus 1 in the foregoing various embodiments. The foregoing embodiments may be realized using computer hardware and a computer program executed thereon. FIG. 16 is a schematic view of a computer system 340. FIG. 17 is a block diagram of the computer system 340.

In FIG. 16, the computer system 340 includes a computer 341 including an FD (flexible disk) drive and a CD-ROM (compact disk read only memory) drive, a keyboard 342, a mouse 343, a monitor 344, and a microphone 345.

In FIG. 17, the computer 341 includes not only the FD drive 3411 and the CD-ROM drive 3412, but also an MPU 3413, a bus 3414 that is connected to the MPU 3413, the CD-ROM drive 3412, and the FD drive 3411, a ROM 3415 in which a program such as a startup program is to be stored, a RAM 3416 that is connected to the MPU 3413 and in which a command of an application program is temporarily stored and a temporary storage area is to be provided, and a hard disk 3417 in which an application program, a system program, and data are to be stored. Although not shown, the computer 341 may further include a network card that provides connection to a LAN.

The program for causing the computer system 340 to execute the functions of the image output apparatus 1 in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system or a third party program to cause the computer 341 to execute the functions of the image output apparatus 1 in the foregoing embodiments. The program may only include a command portion to call an appropriate function in a controlled mode and obtain the desired results. The manner in which the computer system 340 operates is well known, and, thus, a detailed description thereof has been omitted.

It should be noted that, in the program, in a transmitting step of transmitting information, a receiving step of receiving information, or the like, a process performed by hardware, for example, a process performed by a modem or an interface card in the transmitting step (a process that can be performed only by such hardware) is not included.

Furthermore, the computer that executes this program may be a single computer, or may be multiple computers. More specifically, centralized processing may be performed, or distributed processing may be performed.

Furthermore, in the foregoing embodiments, each processing (each function) may be realized as integrated processing using a single apparatus (system), or may be realized as distributed processing using multiple apparatuses.

It will be appreciated that the present invention is not limited to the embodiments set forth herein, and various modifications are possible within the scope of the present invention.

INDUSTRIAL APPLICABILITY

As described above, the image output apparatus according to the present invention has an effect that this apparatus can reduce or eliminate the problems for a user who is viewing images, and, thus, this apparatus is useful as a television and the like.

LIST OF REFERENCE NUMERALS

1 Image output apparatus
101 Input video storage unit
102 Data broadcast receiving unit
103 Input image acquiring unit
104 Display attribute value acquiring unit
105 Target attribute value acquiring unit
106 Attribute value acquiring unit
107 Difference information acquiring unit
108 Image output unit
109 Accepting unit
110 Condition changing unit
111 Change information changing unit
1051 Target attribute value storage part
1052 Target attribute value acquiring part
1081 Condition storage part
1082 Change information storage part
1083 Judging part
1084 Window size determining part
1085 Output part
1086 Another image output part
1087 PinP output part

The invention claimed is:

1. An image output apparatus comprising one or more processors configured to implement:

an input image acquiring unit that acquires an input image;

a target attribute value acquiring unit that acquires at least one target attribute value, which is an original attribute value of an identifiable object contained within a particular region of the input image, wherein the at least one target attribute value comprises at least one of a target size of the object and a target speed of movement of the object and the original attribute value of the object comprises at least one of the original size of the object and original speed of movement of the object, respectively, and wherein the target attribute value acquiring unit comprises:

a target attribute value storage part that stores a plurality of subject identifiers and at least one associated target attribute value for each of the subject identifiers, wherein the plurality of subject identifiers identify a plurality of different types of objects, and a target attribute value acquiring part that detects, from the plurality of subject identifiers, a subject identifier for identifying the type of the object contained in the input image and acquires an associated at least one target attribute value from the target attribute value storage part;

an attribute value acquiring unit that detects an object which corresponds to the object contained in the input image and which is contained in an output image formed using the input image, and acquires at least one attribute value of the object contained in the output image, wherein the at least one attribute value comprises at least one of a size of the object contained in the output image and a speed of movement of the object contained in the output image;

a difference information acquiring unit that acquires at least one piece of difference information indicating a difference between the at least one target attribute value acquired by the target attribute value acquiring unit and the at least one attribute value acquired by the attribute value acquiring unit; and an image output unit that, in a case where the at least one piece of difference information does not satisfy a predetermined condition, changes an output mode of the output image formed using the input image, and performs output, and wherein the image output unit comprises:

a condition storage part in which the predetermined condition is stored, a judging part that judges whether or not the at least one piece of difference information satisfies the predetermined condition, a window size determining part that determines, in a case where the judging part judges that the at least one piece of difference information does not satisfy the predetermined condition, a size of a window to which the output image is to be output, and an output generator generating the output image to the window having the size determined by the window size determining part.

2. The image output apparatus according to claim 1, wherein, in a case where the difference between the at least one target attribute value and the at least one attribute value is so large that the at least one piece of difference information does not satisfy the predetermined condition, the image output unit changes the output mode of the output image formed using the input image, so as to reduce the difference between the at least one target attribute value and the at least one attribute value acquired by the attribute value acquiring unit, and performs output.

3. The image output apparatus according to claim 1, wherein the image output unit further comprises an another image output part that, in a case where the size of the window is smaller than that of a screen frame, outputs an image different from the output image, to a second region different from a region of the window to which the output image is to be output.

4. The image output apparatus according to claim 3, wherein the another image output part performs stroboscopic output to at least two regions obtained by dividing the second region.

5. The image output apparatus according to claim 3, further comprising a data broadcast receiver receiving a data broadcast, wherein the another image output part outputs the data broadcast to the second region.

6. The image output apparatus according to claim 3, wherein the one or more processors are further configured to implement an input video storage unit in which input video that can be divided into at least two chapters can be stored, wherein the input image acquiring unit sequentially reads each of at least two input images contained in the input video from the input video storage unit, and the another image output part outputs an image representing each of the at least two chapters contained in the input video to the second region.

7. The image output apparatus according to claim 3, wherein the another image output part outputs, to the second region, an image obtained by performing image processing different from that performed on the output image, on the same input image from which the output image that is to be output to the window is formed.

8. The image output apparatus according to claim 1, wherein the image output unit further comprises a PinP output part that, in a case where the size of the window determined by the window size determining part is larger than that of a screen frame of the image output apparatus, outputs part of the output image to the screen frame, and outputs an image obtained by reducing the output image, to a window smaller than the screen frame.

9. The image output apparatus according to claim 1, wherein the target attribute value acquiring unit acquires a target size, which is an original size of the object contained in the input image, the attribute value acquiring unit acquires a size of the object contained in the output image formed using the input image, and the difference information acquiring unit acquires size difference information, which is difference information indicating a difference between the target size acquired by the target attribute value acquiring unit and the object size acquired by the attribute value acquiring unit.

10. The image output apparatus according to claim 1, wherein the target attribute value acquiring unit acquires target speed information, which is information on a target value relating to a speed of movement of the object contained in the input image, the attribute value acquiring unit acquires speed information relating to a speed of movement of the object contained in the output image formed using the input image, and the difference information acquiring unit acquires speed difference information, which is difference information indicating a difference between the target speed information acquired by the target attribute value acquiring unit and the speed information acquired by the attribute value acquiring unit.

11. The image output apparatus according to claim 1, wherein, in a case where the at least one piece of difference information does not satisfy the predetermined condition, the image output unit forms and outputs an output image obtained by changing a predetermined at least one attribute value of the input image.

12. The image output apparatus according to claim 11, wherein the predetermined at least one attribute value of the input image is a brightness of the input image.

13. The image output apparatus according to claim 11, wherein the input image acquiring unit acquires at least two input images, and the predetermined at least one attribute value of the input image is a reproduction speed of the at least two input images.

14. The image output apparatus according to claim 11, wherein the input image acquiring unit acquires at least two input images, and the predetermined at least one attribute value of the input image is the number of fields of the at least two input images that are to be output per unit time.

15. The image output apparatus according to claim 1, wherein the one or more processors are further configured to implement a display attribute value acquiring unit that acquires at least one display attribute value, which is an attribute value of a display screen of the image output apparatus, wherein a manner of the image output unit for changing the output mode varies depending on the at least one display attribute value.

16. The image output apparatus according to claim 1, wherein the one or more processors are further configured to implement:

an accepting unit that accepts a change instruction, which is an instruction to change the predetermined condition; and a condition changing unit that changes the predetermined condition according to the change instruction.

17. The image output apparatus according to claim 1, wherein at least one target attribute value is stored in advance, and the one or more processors are further configured to implement:

an accepting unit that accepts a target attribute value change instruction, which is an instruction to change the target attribute value; and a target attribute value changing unit that changes the target attribute value according to the target attribute value change instruction.

18. The image output apparatus according to claim 1, wherein the one or more processors are further configured to implement:

an accepting unit that accepts change information, which is a degree of changing the output mode of the output image; and a change information changing unit that changes a degree of changing the output mode of the output image, according to the change information;

wherein, in a case where the at least one piece of difference information does not satisfy the predetermined condition, the image output unit changes the output mode of the output image formed using the input image, according to the change information, and performs output.

19. The image output apparatus according to claim 1, wherein the object is a human or an animal and detecting the object comprises recognizing a face of the human or animal.

20. The image output apparatus of claim 1, wherein the type of the object contained in the input image is a vehicle and the associated at least one target attribute value is a target size of the vehicle.

21. The image output apparatus of claim 1, wherein the type of the object contained in the input image is a natural object and the associated at least one target attribute value is a target speed of movement of the natural object.

22. The image output apparatus according to claim 1, wherein:

the at least one target attribute value comprises a target size of the object and a target speed of movement of the object, the at least one original attribute value of the object comprises the original size of the object and original speed of movement of the object, and the at least one attribute value of the object contained in the output image comprises a size of the object contained in the output image and a speed of movement of the object contained in the output image.

23. An image output method, realized with an input image acquiring unit, a target attribute value acquiring unit, an attribute value acquiring unit, a difference information acquiring unit, and an image output unit, comprising:

an input image acquiring step of the input image acquiring unit acquiring an input image;

a target attribute value acquiring step of the target attribute value acquiring unit acquiring at least one target attribute value, which is an original attribute value of an identifiable object contained within a particular region of the input image, wherein the at least one target attribute value comprises at least one of a target size of the object and a target speed of movement of the object and the original attribute value of the object comprises at least one of the original size of the object and original speed of movement of the object, respectively, wherein the target attribute value acquiring step further comprises:

storing, in a target attribute value storage part of the target attribute value acquiring unit, a plurality of subject identifiers and at least one associated target attribute value for each of the subject identifiers, wherein the plurality of subject identifiers identify a plurality of different types of objects, and detecting, by a target attribute value acquiring part of the target attribute value acquiring unit, a subject identifier from the plurality of subject identifiers for identifying the type of the object contained in the input image, and acquiring, by the target attribute value acquiring part, an associated at least one target attribute value from the target attribute value storage part;

an attribute value acquiring step of the attribute value acquiring unit detecting an object which corresponds to the object contained in the input image, and which is contained in an output image formed using the input image and acquiring at least one attribute value of the object contained in the output image formed using the input image, wherein the at least one attribute value of the object contained in the output image comprises at least one of a size of the object contained in the output image and a speed of movement of the object contained in the output image;

a difference information acquiring step of the difference information acquiring unit acquiring at least one piece of difference information indicating a difference between the at least one target attribute value acquired in the target attribute value acquiring step and the at least one attribute value acquired in the attribute value acquiring step; and an image output step of the image output unit, in a case where the at least one piece of difference information does not satisfy a predetermined condition, changing an output mode of the output image formed using the input image, and performing output, and wherein the image output step further comprises:

storing the predetermined condition in a condition storage part of the image output unit, judging, by a judging part of the image output unit, whether or not the at least one piece of difference information satisfies the predetermined condition, determining, by a window size determining part of the image output unit, in a case where the judging part judges that the at least one piece of difference information does not satisfy the predetermined condition, a size of a window to which the output image is to be output, and generating, by an output generator of the image output unit, the output image to the window having the size determined by the window determining part.

24. A non-transitory computer-readable storage medium in which a program is stored, the program being for causing a computer to function as:

an input image acquiring unit that acquires an input image;

a target attribute value acquiring unit that acquires at least one target attribute value, which is an original attribute value of an identifiable object contained within a particular region of the input image, wherein the at least one target attribute value comprises at least one of a target size of the object and a target speed of movement of the object and the original attribute value of the object comprises at least one of the original size of the object and original speed of movement of the object, respectively, and wherein the target attribute value acquiring unit comprises:

a target attribute value storage part that stores a plurality of subject identifiers and at least one associated target attribute value for each of the subject identifiers, wherein the plurality of subject identifiers identify a plurality of different types of objects, and a target attribute value acquiring part that detects, from the plurality of subject identifiers, a subject identifier for identifying the type of the object contained in the input image and acquires an associated at least one target attribute value from the target attribute value storage part;

an attribute value acquiring unit that detects an object which corresponds to the object contained in the input image and which is contained in an output image formed using the input image and acquires at least one attribute value of the object contained in the output image formed using the input image, wherein the at least one attribute value comprises a size of the object contained in the output image and a speed of movement of the object contained in the output image;

a difference information acquiring unit that acquires at least one piece of difference information indicating a difference between the at least one target attribute value acquired by the target attribute value acquiring unit and the at least one attribute value acquired by the attribute value acquiring unit; and an image output unit that, in a case where the at least one piece of difference information does not satisfy a predetermined condition, changes an output mode of the output image formed using the input image, and performs output, and wherein the image output unit comprises:

a condition storage part in which the predetermined condition is stored, a judging part that judges whether or not the at least one piece of difference information satisfies the predetermined condition, a window size determining part that determines, in a case where the judging part judges that the at least one piece of difference information does not satisfy the predetermined condition, a size of a window to which the output image is to be output, and an output generator generating the output image to the window having the size determined by the window size determining part.

25. An image output apparatus comprising one or more processors configured to implement:

an input image acquiring unit that acquires an input image;

a target attribute value acquiring unit that acquires at least one target attribute value, which is an original attribute value of an identifiable object contained in the input image, and wherein the target attribute value acquiring unit comprises:

a target attribute value storage part that stores a plurality of subject identifiers and an associated attribute identifier and associated target attribute value for each of the subject identifiers, wherein the plurality of subject identifiers identify a plurality of different types of objects, and a target attribute value acquiring part that detects, from the plurality of subject identifiers, a subject identifier for identifying the type of the object contained in the input image and acquires the associated target attribute value from the target attribute value storage part;

an attribute value acquiring unit that detects an object contained in an output image formed using the input image, and acquires at least one attribute value of the object contained in the output image;

a difference information acquiring unit that acquires at least one piece of difference information indicating a difference between the at least one target attribute value acquired by the target attribute value acquiring unit and the at least one attribute value acquired by the attribute value acquiring unit; and an image output unit that, in a case where the at least one piece of difference information does not satisfy a predetermined condition, changes an output mode of the output image formed using the input image, and performs output, and wherein the image output unit comprises:

a condition storage part in which the predetermined condition is stored, a judging part that judges whether or not the at least one piece of difference information satisfies the predetermined condition, a window size determining part that determines, in a case where the judging part judges that the at least one piece of difference information does not satisfy the predetermined condition, a size of a window to which the output image is to be output, and an output generator generating the output image to the window having the size determined by the window size determining part.

* * * * *